United States Patent [19]
Metz

[11] Patent Number: 6,119,397
[45] Date of Patent: *Sep. 19, 2000

[54] EXTENDIBLE AND RETRACTABLE POLE

[76] Inventor: Donald Metz, c/o N.Y. Dock & Door, Inc., 7000 Airways Park Dr., East Syracuse, N.Y. 13057

[*] Notice: This patent is subject to a terminal disclaimer.

[21] Appl. No.: 09/404,293

[22] Filed: Sep. 24, 1999

Related U.S. Application Data

[63] Continuation-in-part of application No. 09/153,038, Sep. 15, 1998, abandoned, which is a continuation-in-part of application No. 08/949,406, Oct. 14, 1997, Pat. No. 5,964,059.
[60] Provisional application No. 60/101,821, Sep. 25, 1998.
[51] Int. Cl.[7] ..................................................... E01F 13/00
[52] U.S. Cl. ..................................................... 49/49; 404/6
[58] Field of Search ................................. 49/25, 35, 49, 49/131; 404/6, 9, 11

[56] References Cited

U.S. PATENT DOCUMENTS

| | | | |
|---|---|---|---|
| 3,086,430 | 4/1963 | Emmel | 49/49 |
| 3,417,508 | 12/1968 | Sprung | 49/35 |
| 4,122,629 | 10/1978 | Rennick | 49/357 |
| 4,576,508 | 3/1986 | Dickinson | 49/49 |
| 4,715,742 | 12/1987 | Dickinson | 49/49 |
| 4,919,563 | 4/1990 | Stice | 49/49 |
| 5,365,694 | 11/1994 | Macaluso | 49/49 |
| 5,425,595 | 6/1995 | Roper | 49/49 |

*Primary Examiner*—Daniel P. Stodola
*Assistant Examiner*—Curtis A. Cohen
*Attorney, Agent, or Firm*—Sughrue, Mion, Zinn, Macpeak & Seas, PLLC

[57] ABSTRACT

A safety pole is comprised of a strip of plastic material having a normal elongated hollow cylindrical condition with overlapping longitudinal edges. A motor driven drum is mounted within a canister adapted to be recessed in the ground in spaced relation to a loading dock with the strip of plastic material connected at one end to the drum whereby the strip of plastic material may be wound on the drum in a flattened condition or extended vertically upwardly to form a pole. A loading dock is provided with a door and the operation of the motor driven drum is coordinated with the operation of the door so that when the door is open, the pole will be in the extended visible condition to warn a truck driver not to approach or leave a loading dock.

13 Claims, 26 Drawing Sheets

FIG. 13
FIG. 14
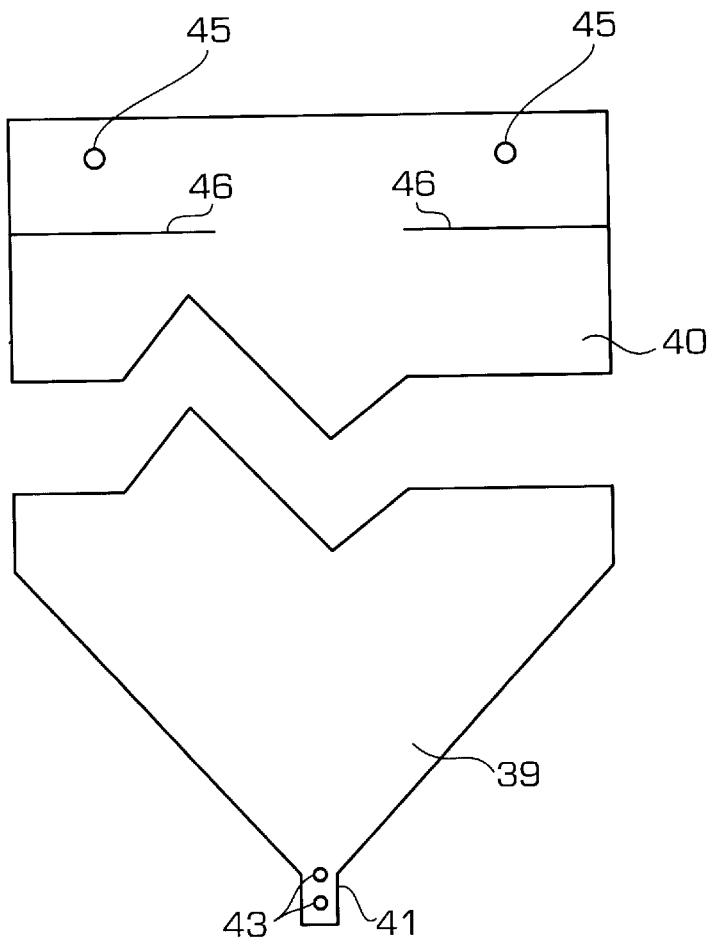
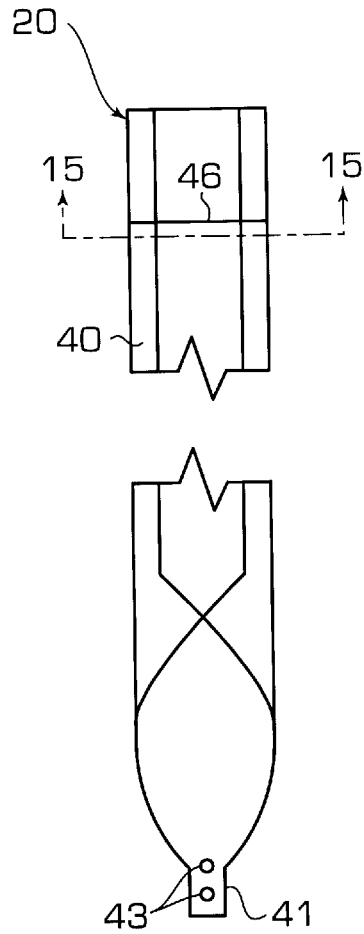
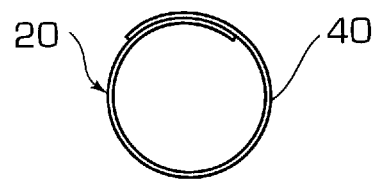
FIG. 15

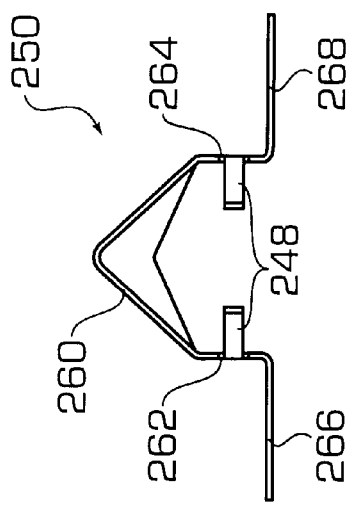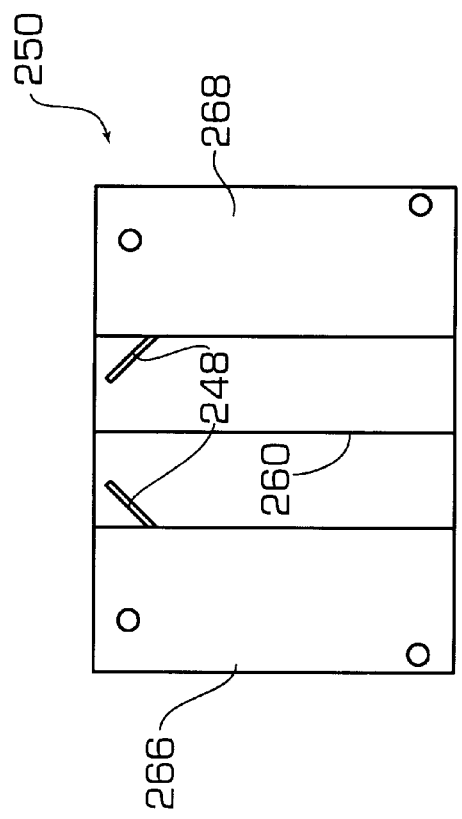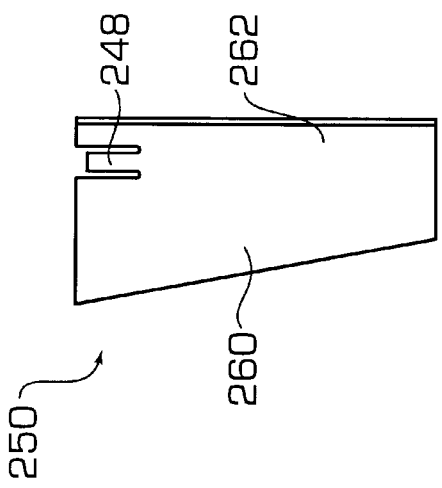

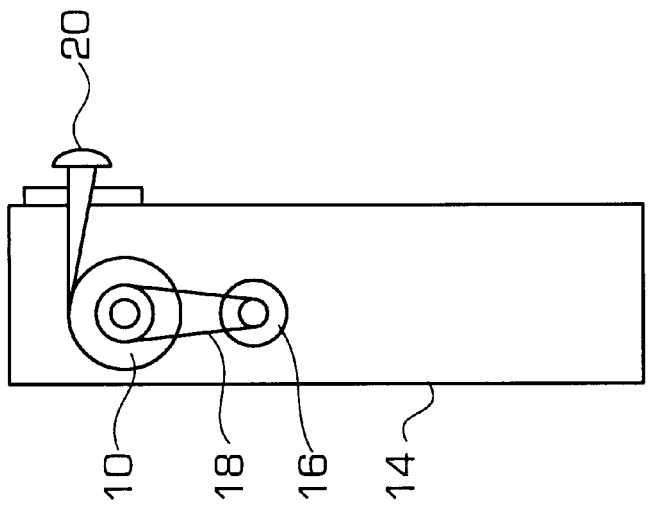
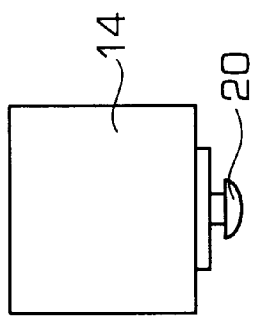
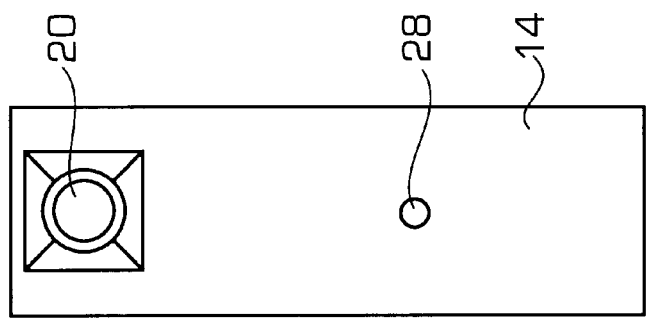
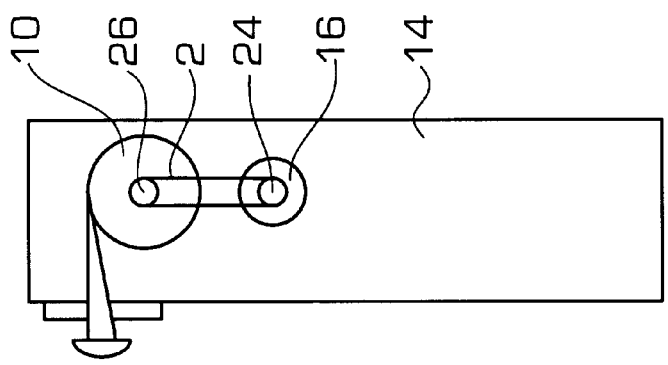

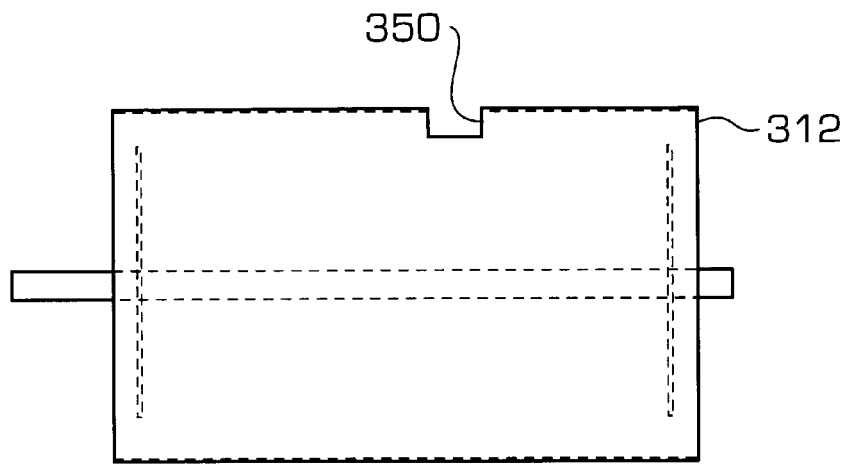
FIG. 34
FIG. 35
FIG. 36
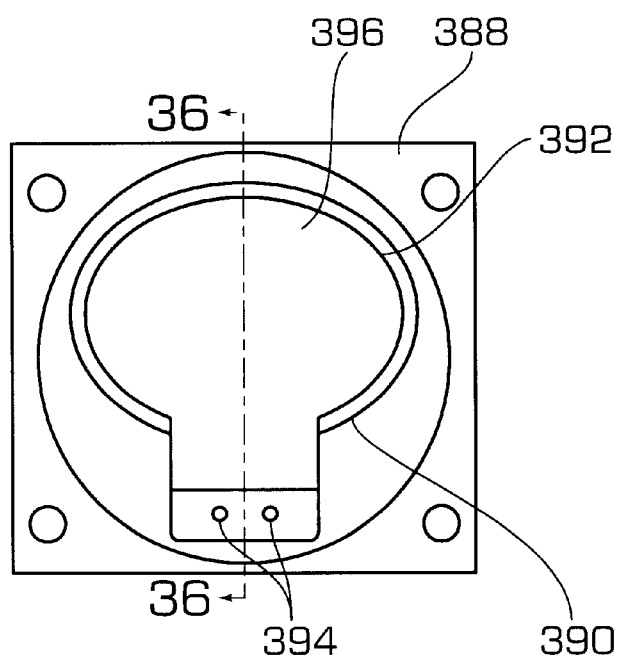
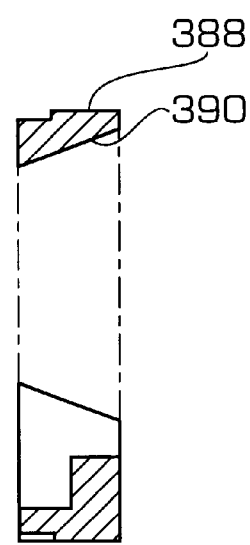

EXTENDIBLE AND RETRACTABLE POLE

RELATED APPLICATIONS

The present application is a Continuation-in-Part of application Ser. No. 09/153,038 filed Sep. 15, 1998 now abandoned, which in turn is a continuation-in-part of application Ser. No. 08/949,406 filed Oct. 14, 1997 now U.S. Pat. No. 5,964,059. Applicant also claims priority benefits of provisional application 60/101,821 filed Sep. 25, 1998 under 35 U.S.C. § 119(e).

BACKGROUND OF THE INVENTION

The present invention is directed to an extendible and retractable pole which may be mounted for vertical or horizontal deployment for traffic control, such as controlling the movement of trucks toward and away from a loading dock or controlling the movement of vehicles in other situations.

Many mechanical and electrical devices have been produced over the years in an attempt to increase safety at loading dock areas. All of these devices have had significant problems to the extent that the desired safety factor has not been achieved.

The mechanical devices are generally of the type which provide a physical restraint to prevent the truck from pulling away from a loading dock accidentally or intentionally while a loading or unloading operation is still being performed. Such mechanical devices however have proven to have high maintenance costs and do not work on all types of trucks. Numerous configurations of mechanical devices have been tried and new ICC bar regulations threaten to complicate the design process of such mechanical restraining devices.

The electrical devices utilized in the past include traffic lights, horns and electric wheel chocks. However, all of these have proved to be inadequate in order to achieve the desired safety factor. The principle difficulty with such electrical devices is that if a truck driver is not aware of the device, he can still pull away from or back into a dock without knowing of any danger.

An extensive review of accident reports at loading docks provided by OSHA and surveys with building owners revealed a surprising statistic. In well over 90% of personal injury cases, the cause of the accident was miscommunication. Frequently a driver did not know that someone was working on a dock or had not finished loading a truck. A further review showed that most of the accidents occurred while backing into the loading dock, not pulling out prematurely.

After review of the statistics and surveys, one common denominator began to appear. It became clear that if some kind of signal device could be provided in front of the loading dock and in front of the truck driver, most of the accidents could be avoided. If you can put some type of physical barrier in the path of a driver, he will not run over it. While several types of existing barriers are known, such as railroad crossing gates or barriers which can be pivoted between a horizontal ground level position and a vertical upstanding position, such barriers generally are unacceptable since the barrier would interfere with truck positioning as well as snow removal on the dock pad. Furthermore, if such rigid devices were accidentally hit by the truck, the barrier would be destroyed.

Examples of such barriers are found in the U.S. patents to Quante (U.S. Pat. No. 4,713,910), Fletcher (U.S. Pat. No. 4,901,071) and Caldwell (U.S. Pat. No. 5,146,710). The device in each of these patents is comprised of a pole which can be pivoted from a horizontal ground level position to a vertical position to provide a barrier post for parking lots and passageways. The patent to Quante also discloses an embodiment wherein the pole can be vertically retracted into a hole in the ground. Each of the barrier posts disclosed in these patents would be severely damaged, generally beyond repair, if struck by a vehicle.

Traffic barriers used in conjunction with a toll facility or a parking facility are usually comprised of a pivoted gate or arm mounted for pivotal movement about a horizontal axis on a support post or column. Such gates or arms are usually made of wood or rigid plastic material which will break off upon accidental impact by a vehicle to prevent damage to the pivot mechanism. Even so, the replacement of a broken gate is expensive and time consuming. Such pivoted gates are sometimes accidentally lowered onto a vehicle causing dents or scratches in the vehicle body.

SUMMARY OF THE INVENTION

The present invention provides an extendible and retractable pole for use in conjunction with loading docks to provide increased safety with respect to truck operations on the dock pad and for use in other vehicle related control situations.

The present invention provides a new and improved extendible and retractable pole comprised of a flat strip of plastic material secured to and wound on a motor driven drum mounted in a canister adapted to be set in the ground in spaced relation to a loading dock and guide means for directing said flat strip of plastic material vertically upwardly upon rotation of said drum in an unwinding direction, said strip of plastic material having a memory whereby upon extension of the strip in the vertical direction, the strip will automatically form into a cylindrical pole to warn a truck driver not to approach or leave a loading dock.

The present invention provides a new and improved safety pole for use in conjunction with a loading dock whereby the safety pole will be automatically extended and retracted when an overhead door on the loading dock is raised and lowered, respectively.

The present invention provides a new and improved extendible and retractable pole which is substantially indestructible even if the pole is bent inadvertently by vehicle contact since the pole will be automatically restored to its vertical, cylindrical configuration upon removal of the vehicle due to the inherent memory of the plastic strip.

The present invention provides a new and improved extending and retractable pole comprised of a flat strip of plastic material secured to and wound on a motor driven drum and mounted on the upper end of a vertically disposed support member. The drum has a horizontally disposed axis of rotation and guide means for directing said flat strip of plastic material outwardly of the housing in which the drum is mounted in a horizontal direction upon rotation of said drum in an unwinding direction. The strip of plastic material has a memory whereby upon extension of the strip in the horizontal direction, the strip will automatically form into a cylindrical pole to act as a gate for regulating the flow of traffic past the gate in response to automatic or manual controller means.

The above and other objects, features and advantages of the present invention will be more apparent and more readily appreciated from the following detailed description of preferred exemplary embodiment of the present invention, taken in connection with the accompanying drawings.

BRIEF DESCRIPTION OF THE DRAWINGS

FIG. 13 is a plan view of the plastic strip with the center portion broken away, showing the ends of the plastic strip in a flat condition.

FIG. 14 is an elevational view of the pole with the center portion broken away, showing the cylindrical configuration of the plastic strip.

FIG. 15 is a sectional view taken along the line 15—15 in FIG. 14.

FIG. 21 is a top plan view of the center guide for the pole.

FIG. 22 is a side elevational view of the center guide shown in FIG. 21.

FIG. 23 is a front elevational view of the center guide as shown in FIG. 21.

FIG. 27 is a side elevation view of the opposite side of the post shown in FIG. 26 with the pole retracted.

FIG. 28 is a front elevation view of the pole shown in FIG. 27.

FIG. 29 is a top plan view of the pole as shown in FIG. 28.

FIG. 30 is a side elevation view similar to FIG. 26 with the pole retracted.

FIG. 34 is a side view of the drum shown in FIG. 31 showing the location of the peripheral groove.

FIG. 35 is a plan view of the cover plate and sealing member associated with the opening therethrough.

FIG. 36 is a sectional view taken along the line A—A in FIG. 35.

DETAILED DESCRIPTION OF THE INVENTION

The present invention is comprised of two basic embodiments, both utilizing an extendible and retractable plastic pole which may be wound up flat on a drum for storage purposes. According to the first basic embodiment, the pole is disposed in a canister set in the ground for movement up and down in a vertical direction. According to the second basic embodiment of the invention, the pole is mounted for horizontal movement on the top of a support post. The present invention is also directed to several different embodiments of drive arrangements for extending and retracting the pole. The various drive arrangements may be used for either the vertical or horizontal pole embodiments.

Figure 1:
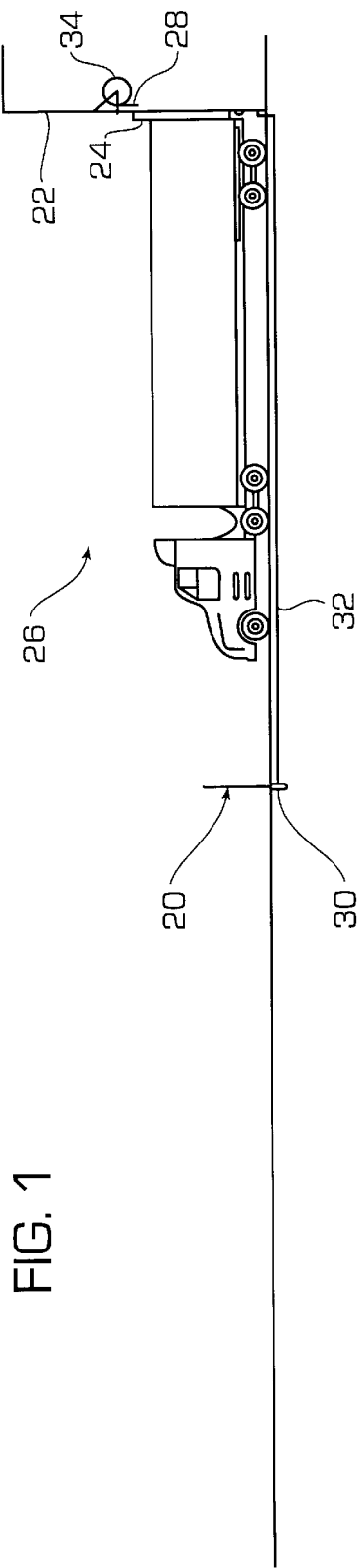
FIG. 1 is a side elevational view showing the relationship of a safety pole, a truck and a loading dock with the truck in contact with the loading dock and the safety pole in the elevated position.

The pole according to the present invention can be used as a safety pole 20 in conjunction with a building 22 having a loading dock 24. The safety pole 20 is spaced from the loading dock 24 approximately 80 feet or a distance sufficient to accommodate the longest tractor trailer unit 26 on the road today. The unit is conventionally backed up to the loading dock 24 and an overhead door 28 is retractably mounted inside the building for opening and closing the loading dock. When the overhead door 28 is in the raised position as shown in FIG. 1, the safety pole 20 will automatically be extended vertically in front of the truck to warn the driver not to pull away from the loading dock since the overhead door 28 is in the raised position.

Figure 2:
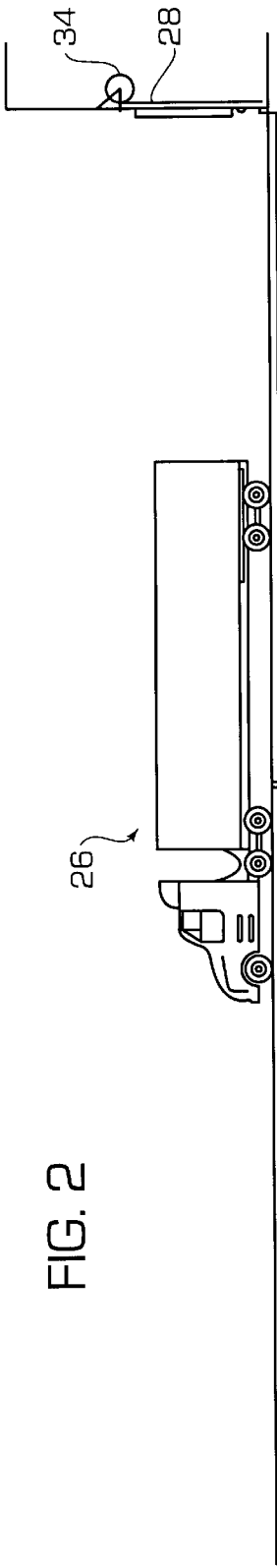
FIG. 2 is a view similar to FIG. 1 showing the truck in transition with the safety pole retracted.
Figure 3:
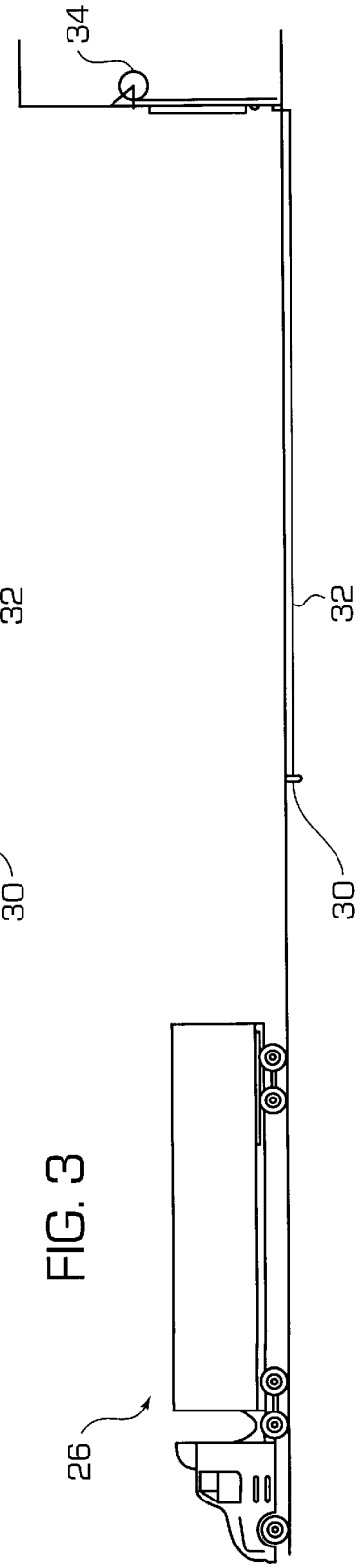
FIG. 3 is a view similar to FIG. 1 with the truck completely out of the loading area and the safety pole in the retracted position.

The safety pole is adapted to be retracted into a canister 30 located below ground level. The pole 20 may be retracted onto a motor driven drum located in the canister. The motor is connected by wires extending through a conduit 32 to the drive unit 34 for raising and lowering the door. Once the loading operation is completed, the door 28 will be lowered and the safety pole 20 will automatically be retracted into the canister 30 as shown in FIGS. 2 and 3. If the overhead door 28 is raised for any reason when a truck is not present at the loading dock, the safety pole 20 will automatically be extended to the position shown in FIG. 1 to warn truck drivers not to approach the loading dock.

The details of the pole and the mechanism for extending and retracting the pole according to a first embodiment are shown in detail in FIGS. 4–15.

The hollow cylindrical drum 42 is connected to and supported by a pair of drum caps 46 and 48. The drum cap 48 is provided with a hub portion 66 which is rotatably supported in a vertically extending frame member 56 by means of a bearing 68. The output shaft 50 from a gear box 51 connected to the output shaft of an electric motor 52 is secured to the hub 66 by means of a set screw 64 whereby rotation of the output shaft 50 will be imparted to the drum 42. The motor 52 and the gear box 51 are supported by a frame member 53 which in turn is support on a fixed hub 67 and the drum cap 46 of the drum 42 is rotatably supported on the hub 67 by means of a bearing 68. Thus, the motor is contained completely within the drum and is protected from dirt or any other debris which might enter the canister 30.

Figure 12:
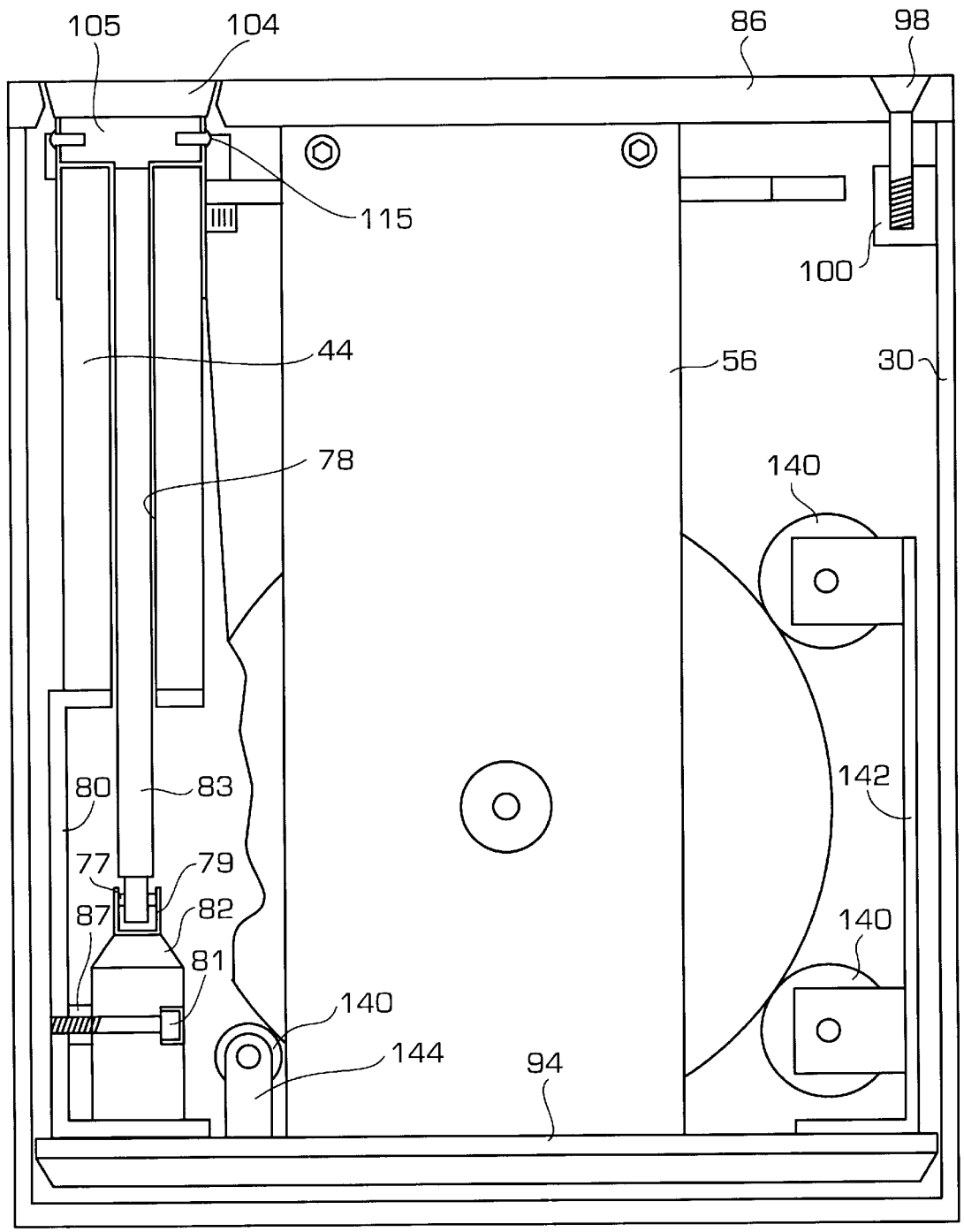
FIG. 12 is a partial sectional view of the canister showing a side elevation view of the internal mechanism in the canister showing different components in section.

The two frame members 56 which support the drum 42 are secured to the ends of a plate 90 secured to the under surface of the top 86 of the canister 30. A base 94 is secured to the frame members 56 by any suitable means and a heating element 92 is secured to the lower surface of the base 94 by any suitable means. The top 86 of the canister is secured to the canister 30 by means of screws 98 which are connected to support brackets 100 secured to the internal surface of the canister 30 adjacent the top edge thereof, as shown in FIG. 12. The canister top 86 is provided with a hole 102 having tapered side walls. A cover 104 having side walls complimentary to the sides of the hole 102 is provided to close the hole 102. The cover 104 is provided with a downwardly extending cylindrical projection 105. The upper end of a plastic strip 40 which forms the pole 20 is connected to the projection 105, as shown in FIG. 12. With the cover 104 in the closed position, the plastic strip 40 is wound up in flat condition on the drum 42. Since the entire motor driven drum assembly and heating element are mounted from the top 86 of the canister 30, the entire assembly will be suspended above the bottom 106 of the canister 30 so that it will not be sitting in water should any water leak into the canister 30. A suitable drain hole (not shown) may be provided in the bottom wall 106 to drain any water which might enter the canister 30.

Figure 5:
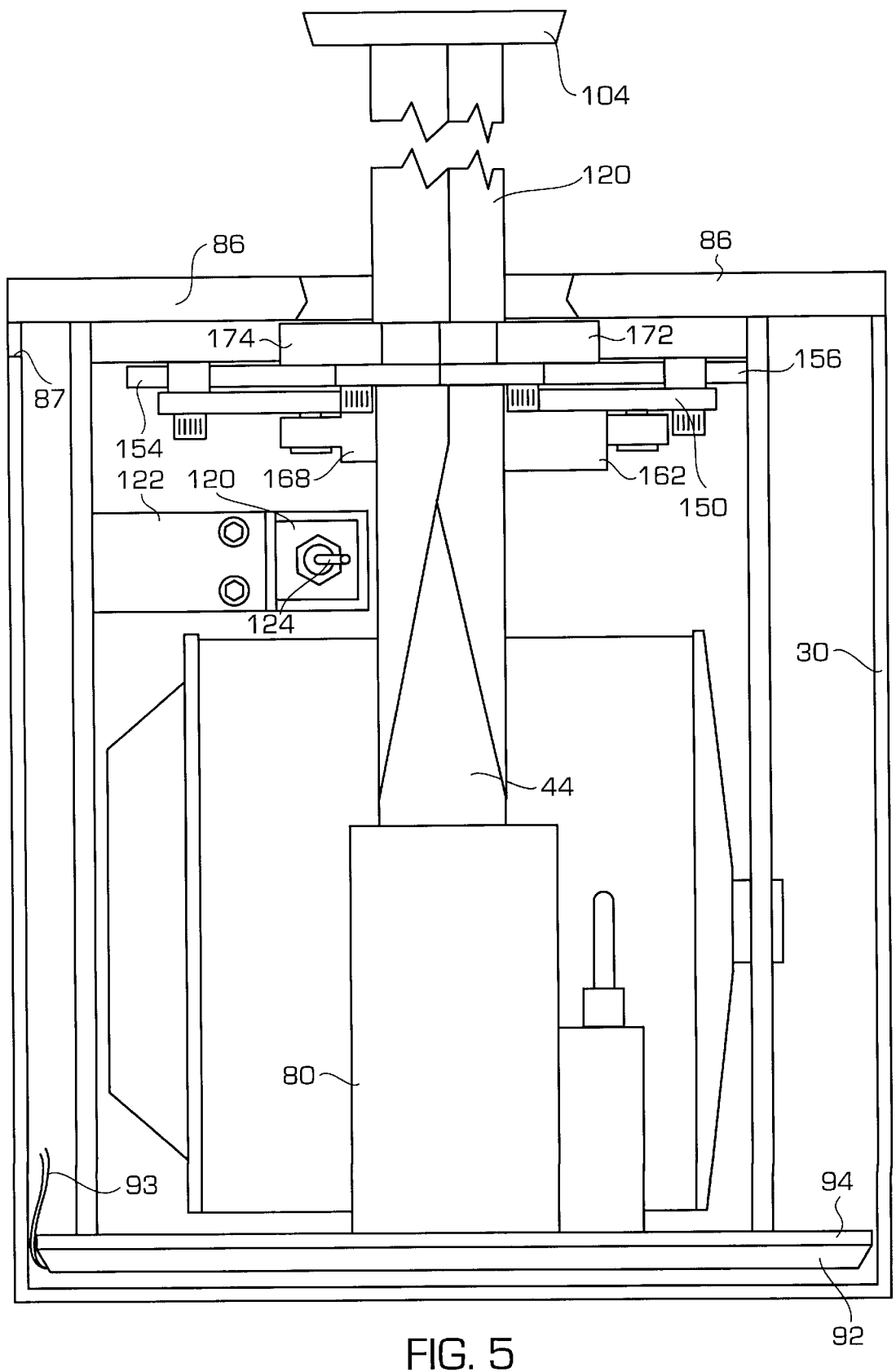
FIG. 5 is a view similar to FIG. 4 with the pole in the extended position.
Figure 6:
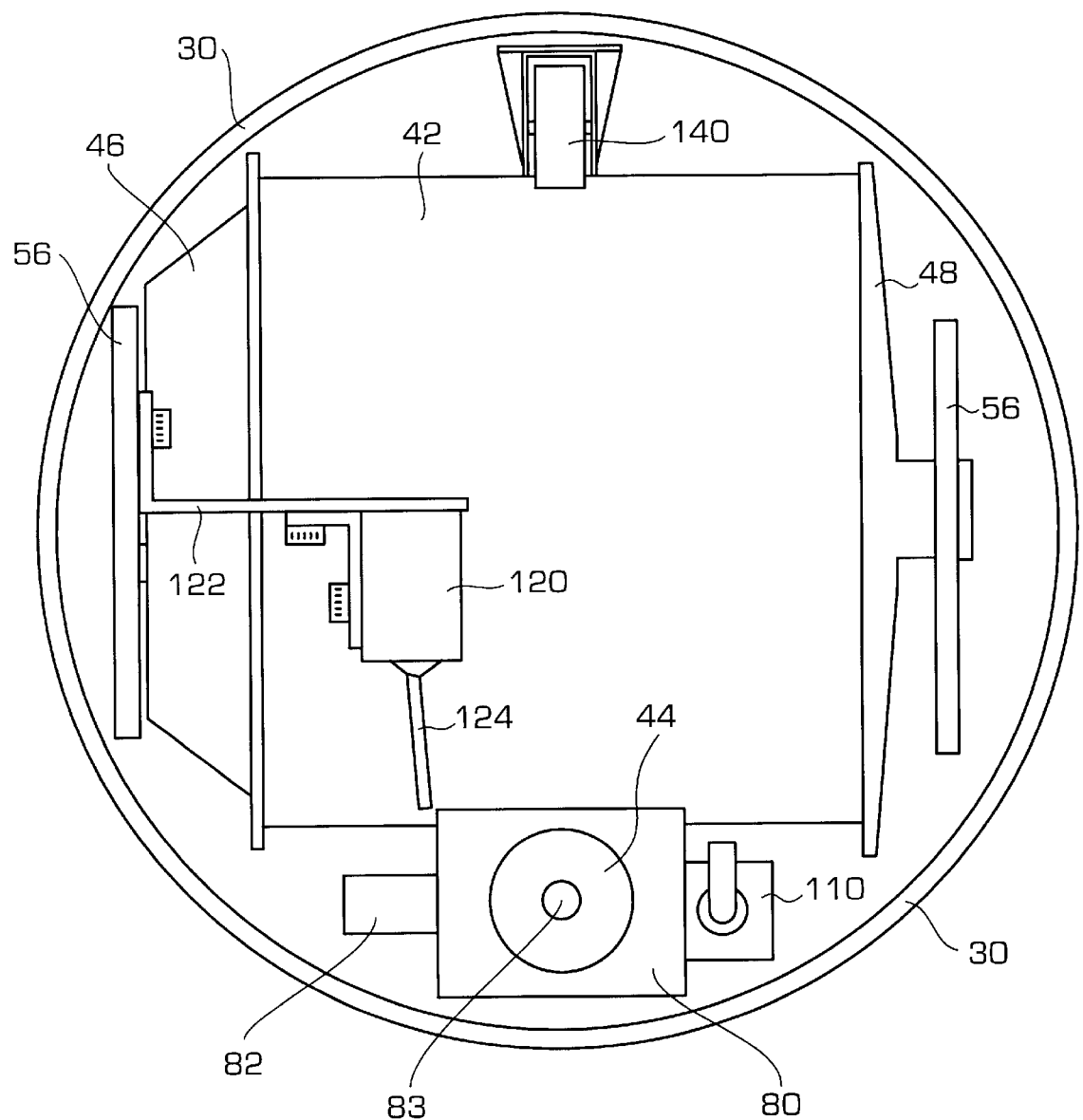
FIG. 6 is a sectional view taken on the line 6—6 in FIG. 4.
Figure 7:
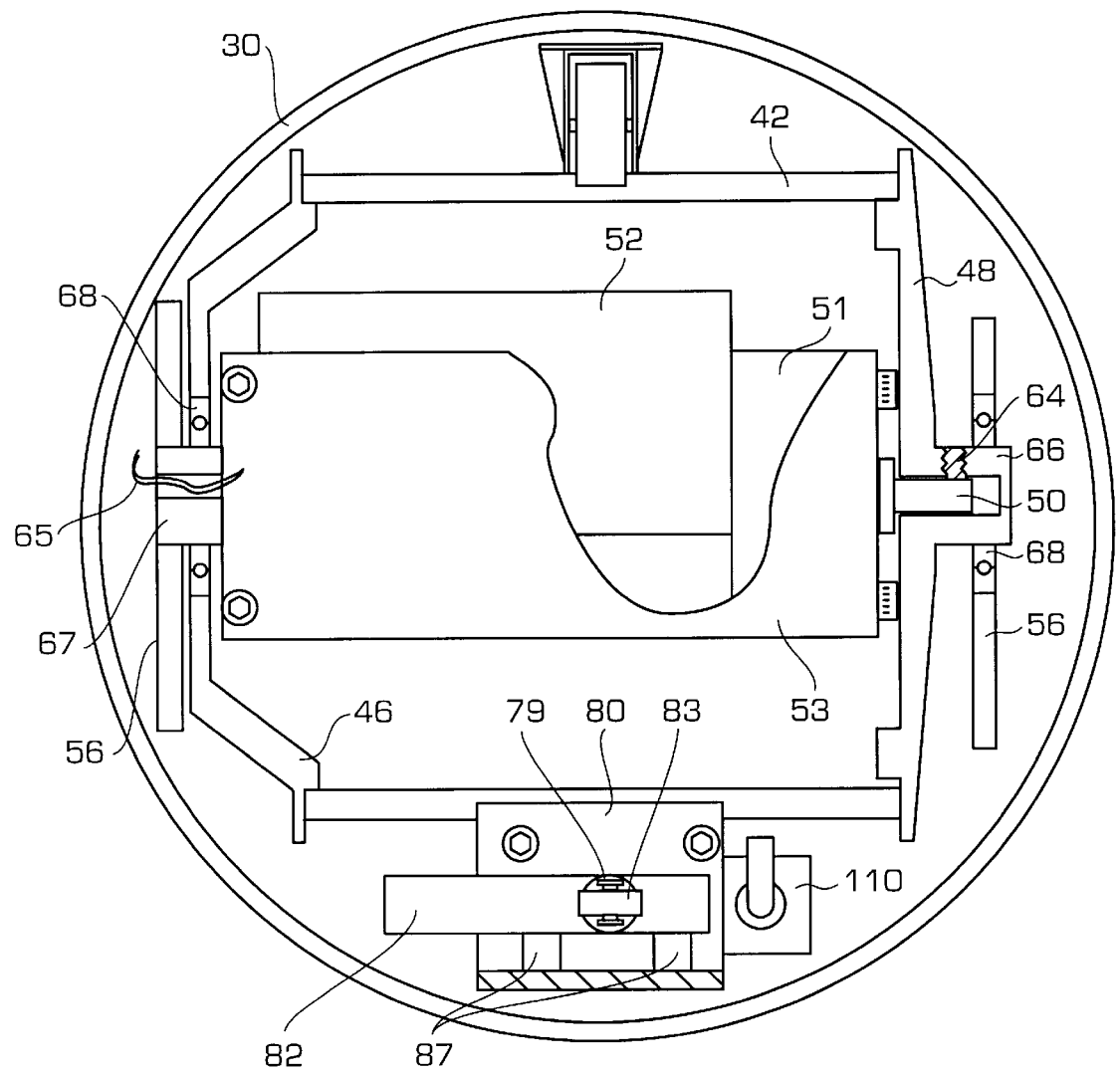
FIG. 7 is a sectional view taken along the line 7—7 in FIG. 4.

A notch 87 is cut in the top edge of the canister 30 adjacent to the top 86 as shown in FIG. 5 through which the wires 65 for the motor, the wires 93 for the heater and various other wires (not shown) from the switches and solenoids may exit the canister. After the wires are located in the notch 87 the notch may be sealed with an epoxy or other sealer (not shown).

Figure 4:
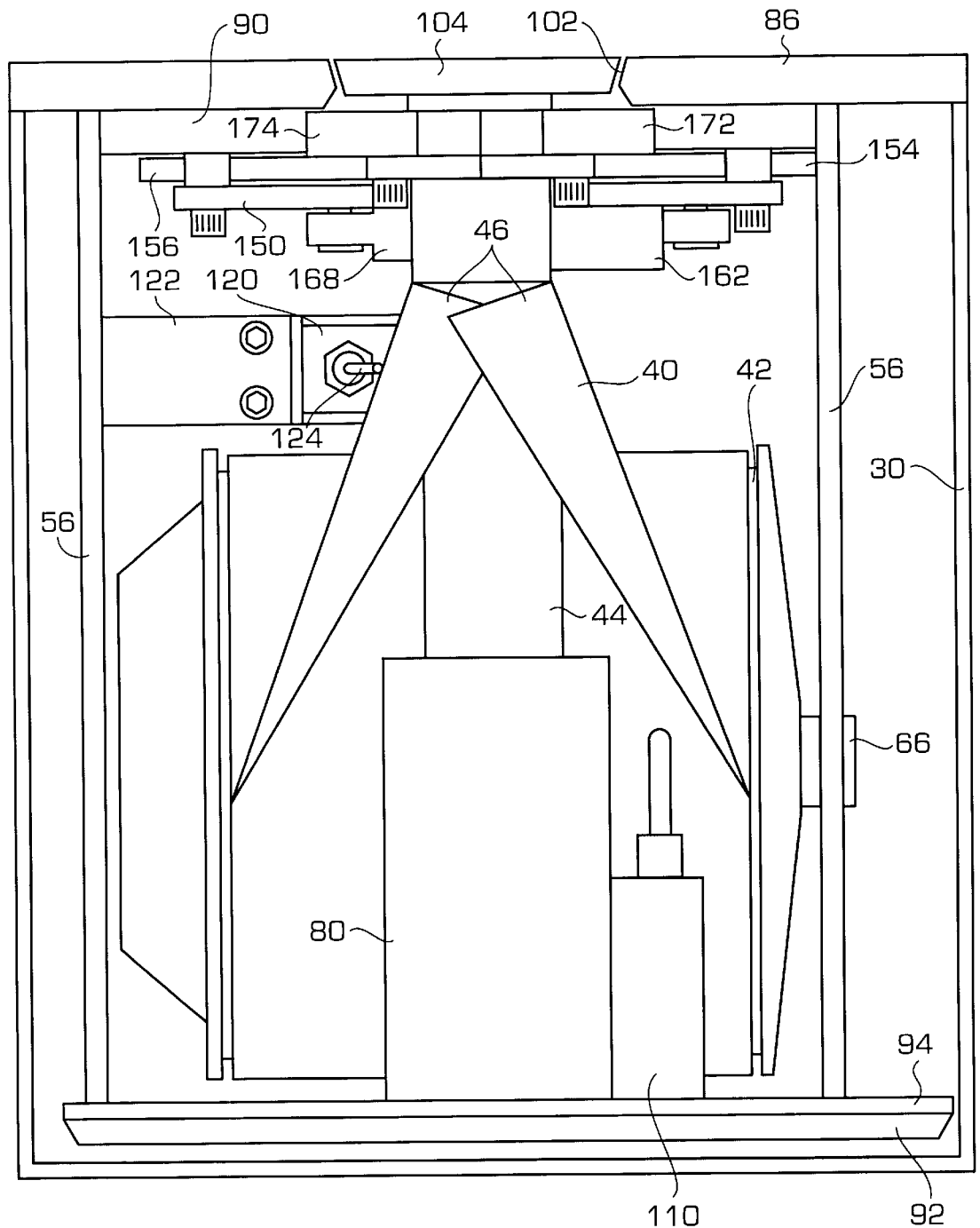
FIG. 4 is a front elevational view of an extendible and retractable pole according to a first embodiment in the retracted position within a canister and wound on a motor driven drum rotatably mounted within the canister, the canister being shown in section.
Figure 11:
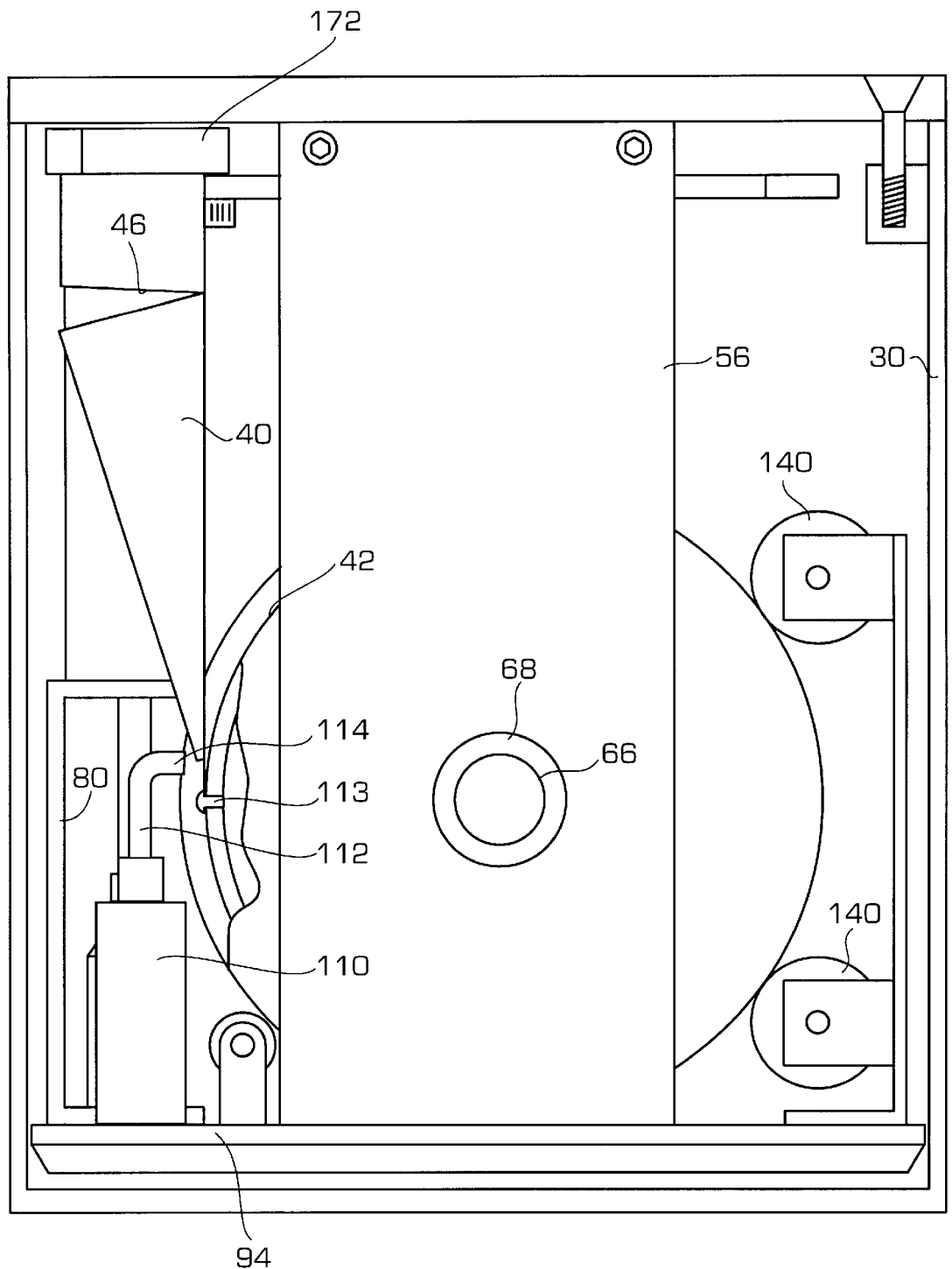
FIG. 11 is a partial sectional view showing a side elevational view of the mechanism within the canister.

The plastic strip 40, which forms the pole 20, is shown in detail in FIGS. 13, 14 and 15. In FIG. 13, the strip 40 is shown in the flat form in which it would be wound on the drum 42. The end 39 of the plastic strip 40 is tapered to form a tab 41 having a pair of apertures 43 extending therethrough. The uppermost end of the plastic strip 40 is squared off and provided with a pair of attachment holes 45. Suitable fasteners 113 (FIG. 11) are provided for securing the tab 41 to the drum 42 through the holes 43. The opposite end of the plastic strip 40 is secured by means of fasteners 115 to the cylindrical extension 105 on the cover 104 as shown in FIG. 12. When the plastic strip 40 is fully retracted on the drum 42 within the canister 30, as shown in FIGS. 4, 11 and 12, the end portion of the plastic strip will remain wrapped about the center guide 44 as shown in FIG. 4.

Since the strip 40 is in transition between a cylindrical configuration at the top end and a flat configuration on the drum 42, a pair of slots 46 are formed in the strip 40 to accommodate the transition. Thus wedge shaped gaps will appear in the pair of slots 46 as seen in FIGS. 4 and 11.

Figure 8:
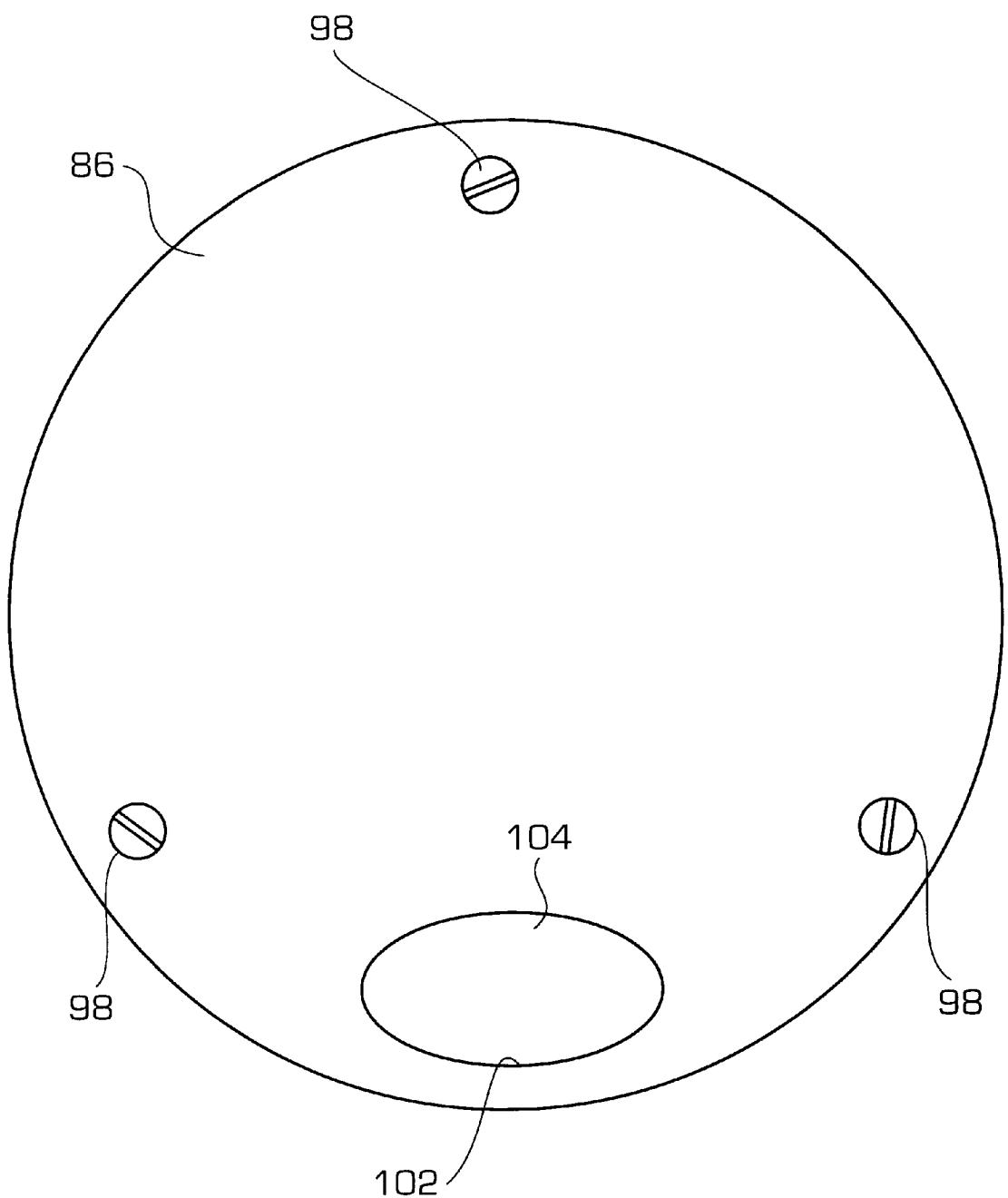
FIG. 8 is a top plan view of the canister with the cover secured thereon.

The plastic strip is extended into the position shown in FIG. 5. The upper end of the plastic strip will extend beyond the top 86 of the canister 30 and the plastic strip will assume a tubular configuration as best seen in FIG. 14. With the strip 40 fully extended, the tab will still be secured to the drum as shown in FIG. 11. Due to the fact that the plastic strip 40 initially has a somewhat oval configuration as it is being formed into a cylindrical tube about the center guide element 44, the hole 102 in the cover 104 has a substantially oval configuration, as best seen in FIG. 8. The center guide 44, about which the plastic strip 40 is formed, is provided with a hollow center portion 78 as shown in FIG. 12 and the guide element 44 is mounted on a C-shaped bracket 80, which in turn, is mounted on the bottom plate 94. A limit switch 82 is mounted on the C-shaped bracket 80 and is secured thereto by means of a bolt 81. An actuator rod 83 for the limit switch 82 is operatively connected to a plunger 79 by means of a cross pen 77 and extends upwardly through the bore 78 in the guide element 44. The upper end of the actuator rod 83 is spring biased upwardly to terminate slightly above the upper end of the guide element 44 when the pole is in the raised position. Upon lowering the pole, the cover 104 will seat in the aperture 102 and the projection 105 will engage the actuator rod 83 and move it downwardly to actuate the limit switch 82.

An additionally safety limit switch 110 is mounted on the base member 94 adjacent the limit switch 82. A bent actuator rod 112 is pivotally mounted in the switch 110 with the end 114 disposed in proximity to the surface of the drum, as shown in FIG. 11. If, upon raising of the pole, the cover 104 engages an obstacle to stop the raising of the pole, the continuous running of the motor will cause the plastic film 40 wound on the drum 42 to bulge outwardly from the surface of the drum, whereupon the plastic film 40 will engage the end 114 of the actuator rod 112 to move the rod and operate the limit switch 110 to shut off the motor.

A further limit switch 120 is mounted on a bracket 122, which in turn is mounted on the frame member 56, as best seen in FIG. 4. The limit switch 120 is provided with a pivoted feeler 124, the end of which is disposed in engagement with the plastic film 40 when it is in the transition stage from the flat coiled condition to the extended tubular condition as best seen in FIG. 4. Once the plastic strip 40 is fully extended into the hollow tubular pole form, the plastic strip will no longer engage the feeler 124, as shown in FIG. 5, whereby the feeler 124 will be pivoted to a position to actuate the switch 120 and shut off the motor 52.

Three guide rollers, 140 are located adjacent the periphery of the drum 42 at angularly spaced positions, as shown in FIG. 12. Two of the rollers 140 are mounted on the base 94 by means of a support bracket 142 and the third roller 140 is mounted on the base member 94 by means of a support bracket 144. The purpose of the guide rollers 140 is to prevent the plastic film 40 from uncoiling outwardly in a spiral manner should the raising of the pole be impeded by any obstacle. This will then force the plastic film into engagement with the operating member 112 of the limit switch 110.

Figure 9:
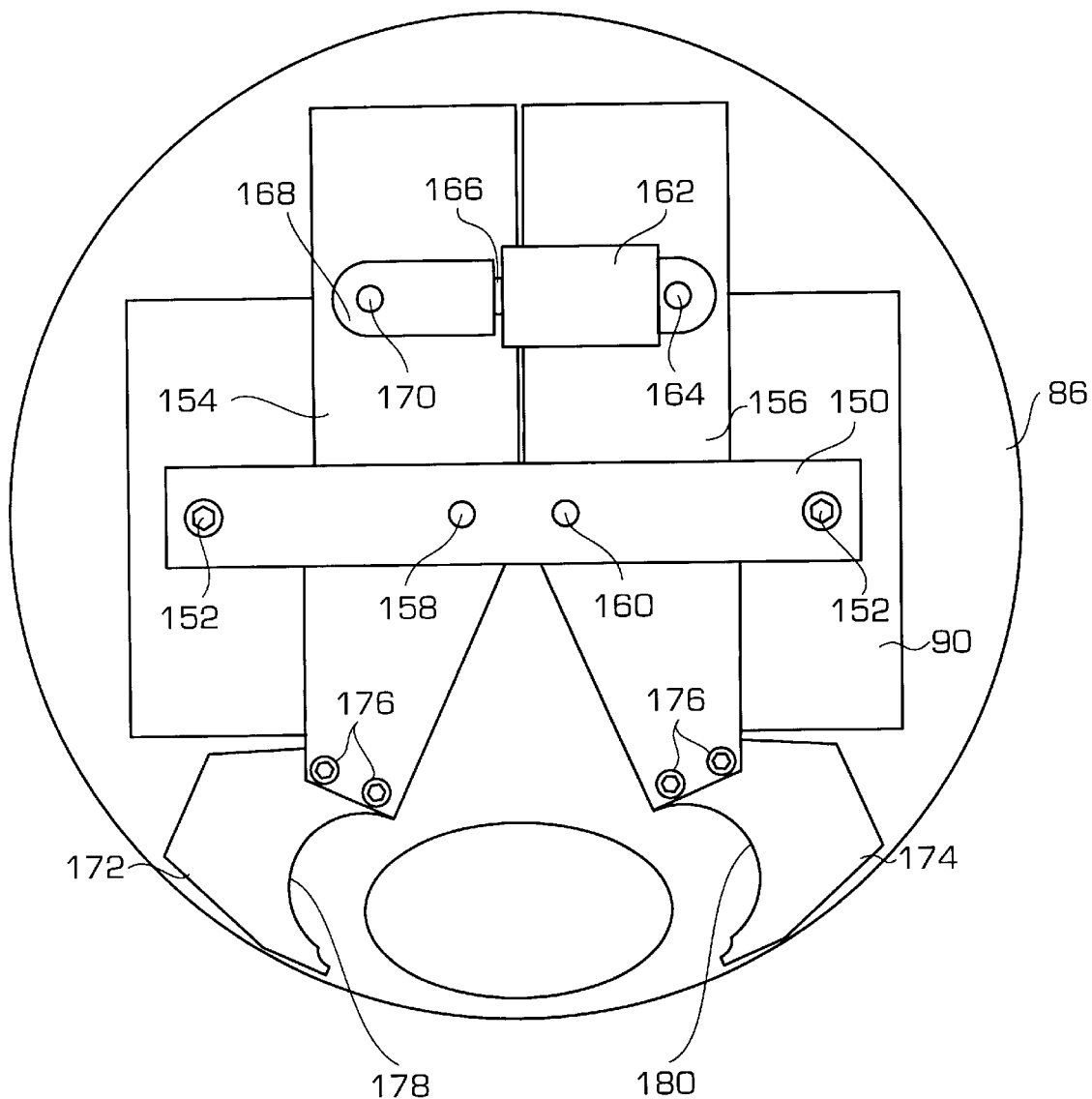
FIG. 9 is a sectional view, taken along the line 9—9 of FIG. 4 showing the pole clamping mechanism with the clamp in the open condition.
Figure 10:
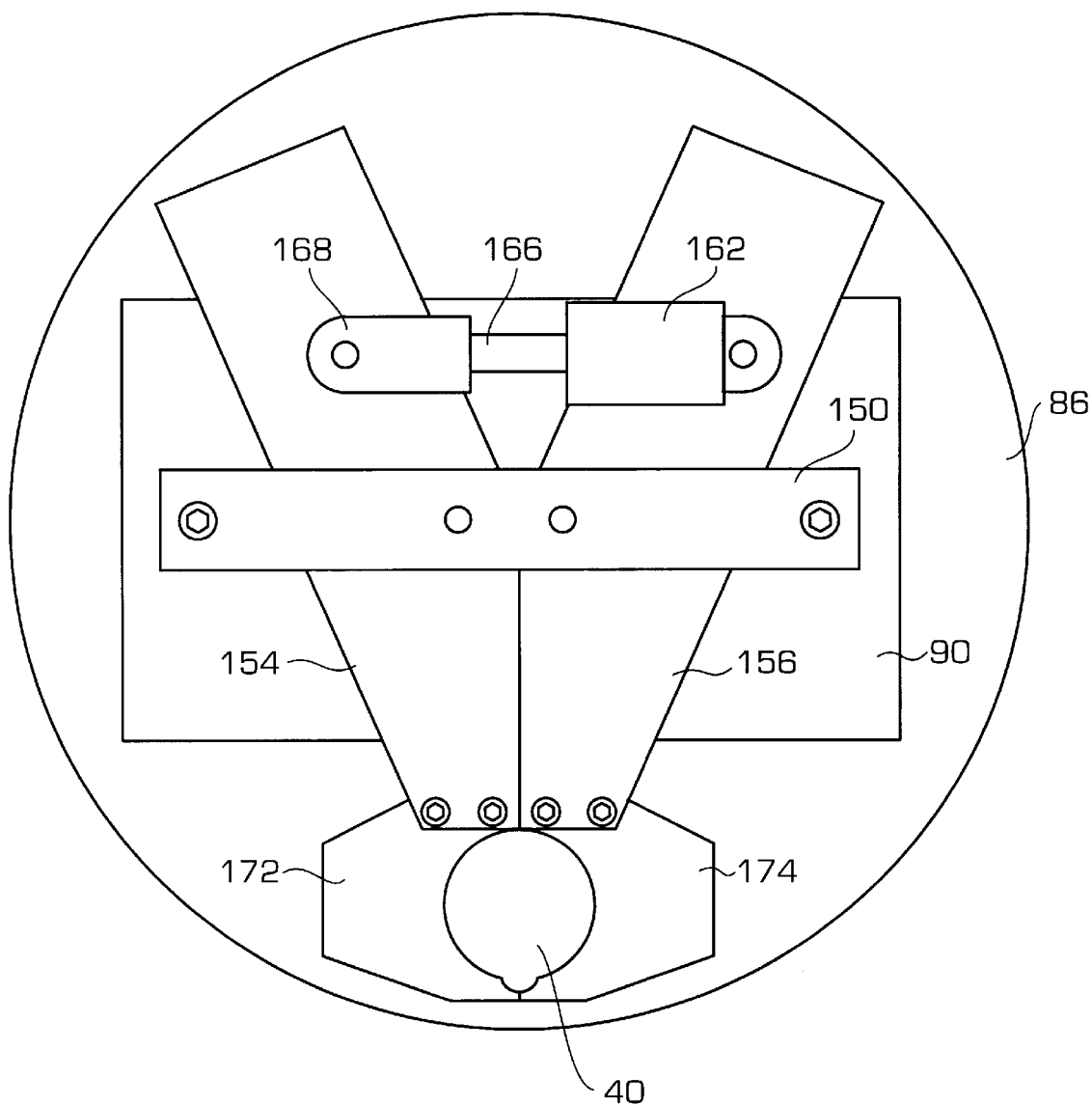
FIG. 10 is a sectional view similar to FIG. 9 with the pole clamping mechanism with the clamp in the clamped condition.

A clamping arrangement for clamping the hollow tubular pole 20 against the cylindrical projection 105 on the under side of the cover 104 is shown in FIGS. 4, 5, 9 and 10. As best seen in FIGS. 9 and 10, a support strap 150 is secured to the underside of the support plate 90 which in turn is secured to the underside of the cover 86 for the canister. The strap 150 is secured to the plate 90 by means of a pair of bolts 152 and a pair of clamp supporting arms 154 and 156 are pivotally mounted between the strap 150 and the support plate 90 on pivot pins 158 and 160, respectively. A solenoid 162 is mounted on the underside of the clamp supporting arm 156 on a pivot pin 164. The armature 166 of the solenoid is connected to a bracket 168 which in turn is pivoted at 170 to the other clamp supporting arm 154. A pair of clamp members 172 and 174 are secured to the ends of the clamp supporting arms 154 and 156, respectively, by means of bolts 176. Each of the clamps 172 and 174 have semi-circular clamping surfaces 178 and 180, respectively which are adapted to engage and clamp the plastic film 40 against the center guide element 44 when the post 20 is in the fully raised position. The clamps 172 and 174 act as shields to close the hole 102 in the top 86 of the canister 30 when the post 20 is extended to prevent the entry of foreign matter into the canister. When it is desired to lower the post, the solenoid is energized to pivot the arms 154 and 156 and move the clamp members 172 and 174 to the unclamped positions as shown in FIG. 9.

Figure 16:
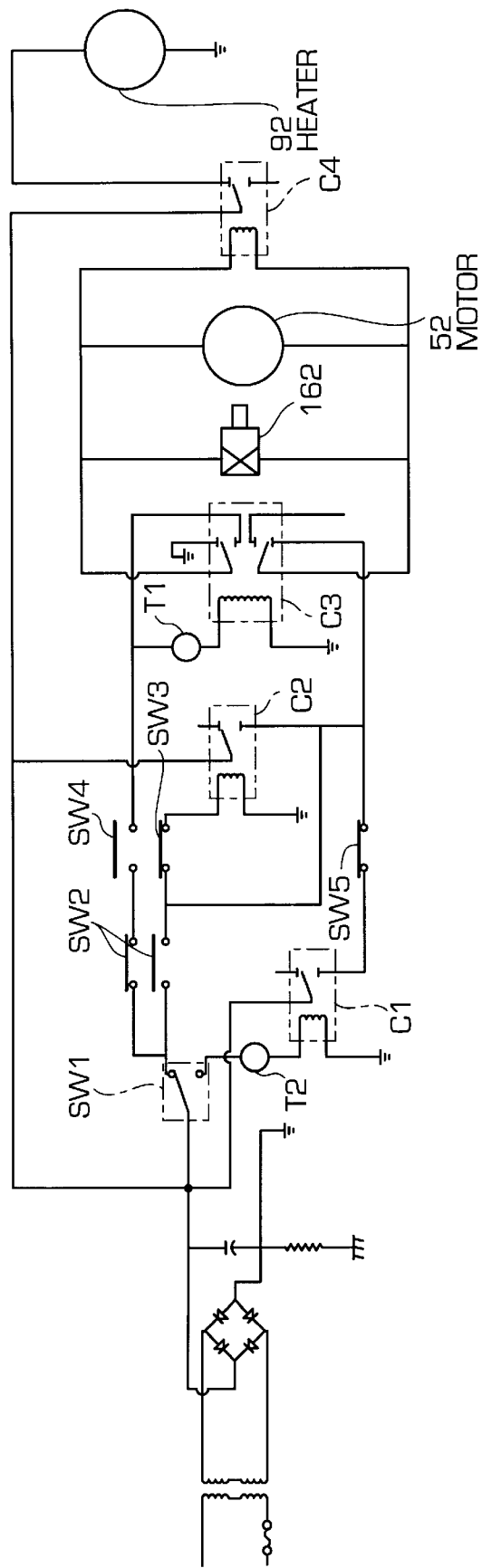
FIG. 16 is a schematic view of the circuitry for controlling the raising and lowering of the extendible and retractable pole when used as a safety pole.

FIG. 16 shows the control circuitry for the motor and the clamping arms associated with the extended pole retraceable pole described above. The motor 52 is a reversible motor and the main motor control is the switch SW1. This switch can be operated in conjunction with the overhead door on a loading dock as described in the example above. The switch SW1 can be operated with conjunction with the operation of the overhead door 28, so upon operation of the motor 34 to raise the overhead door 28, the switch SW1 would automatically be moved to initiate raising of the pole. However, it is obvious that the switch SW1 could be controlled by any other arrangement and is not in anyway limited to the operation of the overhead door of a loading dock.

Upon moving the switch SW1 to the close position as shown in FIG. 16, the power will be supplied through normally closed switch SW2 and normally open switch SW4 which is held in the close position by the pole material when the pole is down and the material is wrapped on the drum. The power will then be supplied to the timer and after a twenty second delay the relay C3 will be operated to supply current to the motor 52 to unwind strip 40 into the raised position to form a pole. The pole will continue up until the switch SW4 opens.

When the switch SW1 is opened, that is moved to the position opposite to that shown in FIG. 16, power will be supplied to the timer T2 and after a twenty second delay the relay C1 will be energized to move the switch therein to supply power to the motor 52 for rotation in the opposite direction to retrace the pole and wind the strip 40 on the drum. The pole will continue down until the switch SW5 is opened. The timer T2 is provided so that if there is a failure in the switch SW5 or a pole problem after twenty seconds, the motor will shut off and a suitable warning light can be provided to indicate a problem.

If the pole is activated to move into the up position and meets an obstacle, the pole material will buckle causing the normally open switch SW2 to close thereby supplying power to the relay C2 which will then supply power to the motor 52 to operate in the direction to retract the pole. When the pole is fully wound on the drum, normally closed switch SW3 will open stopping the motor. If switch SW1 is still closed, that is in the door open condition, the timer T1 will not allow the pole to go back up for twenty seconds.

The solenoid 162 for operating the clamps 172 and 174 is wired in conjunction with the motor 52, so that any time there is power supply to the motor in the up or down condition, the solenoid 162 will be opened to move the clamps 172 and 174 to the open non-clamping position.

The details of the pole and mechanism for extending and retracting the pole according to a second embodiment is shown in detail in FIGS. 17–24.

A hollow, cylindrical drum 200 is connected a hub 202 by means of an internal support bracket 204 welded or otherwise secured to the interior of the drum 200 and the hub 202. A motor and gear box assembly are mounted on a motor bracket 208 which in turn is mounted on a main frame 210, which in turn is secured to the underside of the top 212 of the canister 214 by means of bolts (not shown). The hub 202 and output shaft 216 of the gear box are connected by any suitable means such as splines, set screw or welding whereby the hub and the drum secured thereto will rotate with the output shaft.

The hub 202 is provided with an extension 219 having a sprocket wheel 220 mounted thereon for rotation with the hub 202. A second sprocket wheel 222 is rotatably mounted on a support spindle 224 which is secured to the main frame 210 by means of a bolt 227. A magnet 228 is mounted on the timing chain 226 and cooperates with a Hall effect transistor 230 mounted within a compartment 232 which is mounted on the main frame 210. The compartment 232 contains all of the solid state electronic equipment for controlling the entire operation of the extendible and retractable pole as discussed hereinafter.

Figure 18:
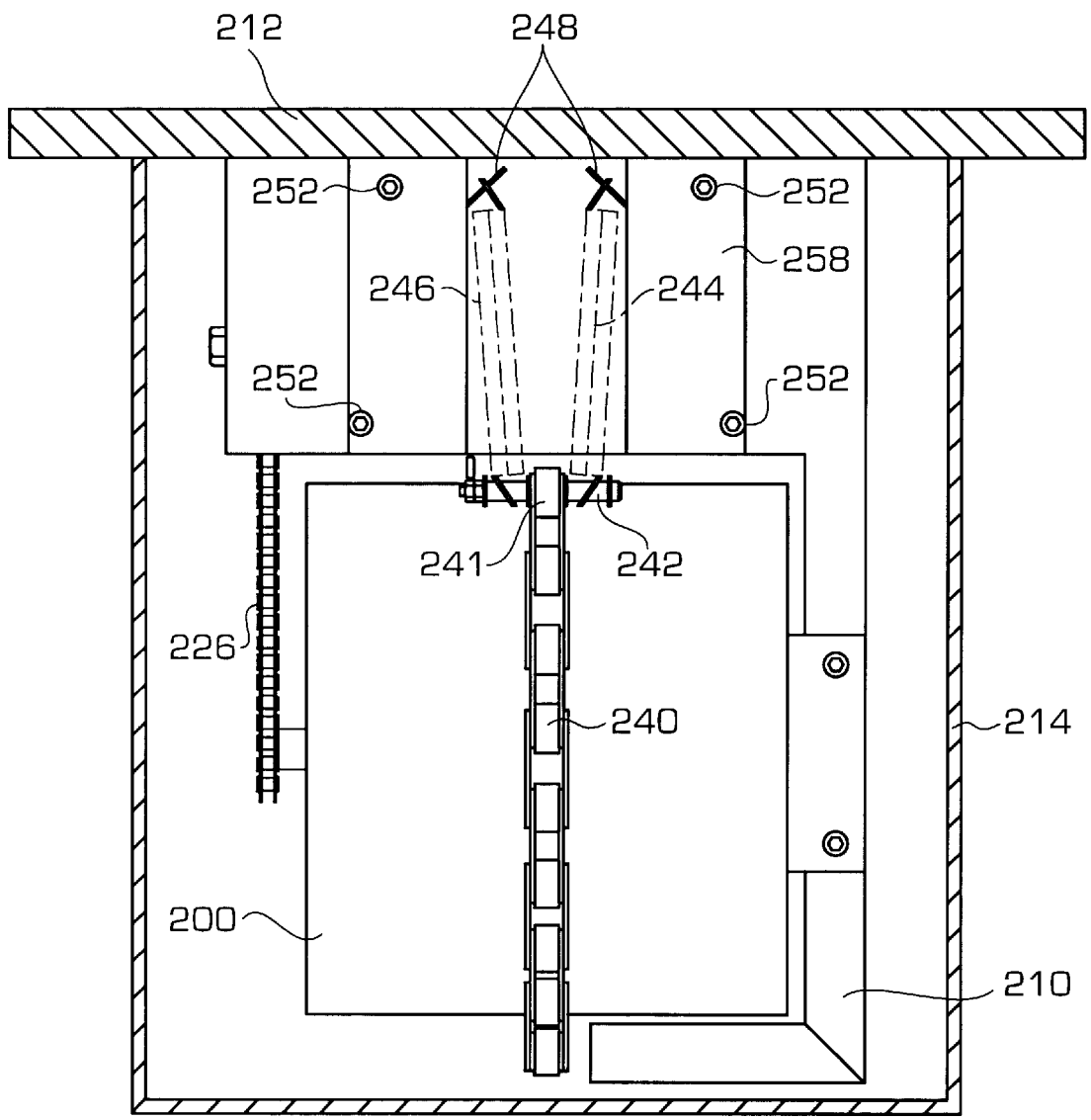
FIG. 18 is a view similar to FIG. 17 with the safety switch mounting plate removed.
Figure 19:
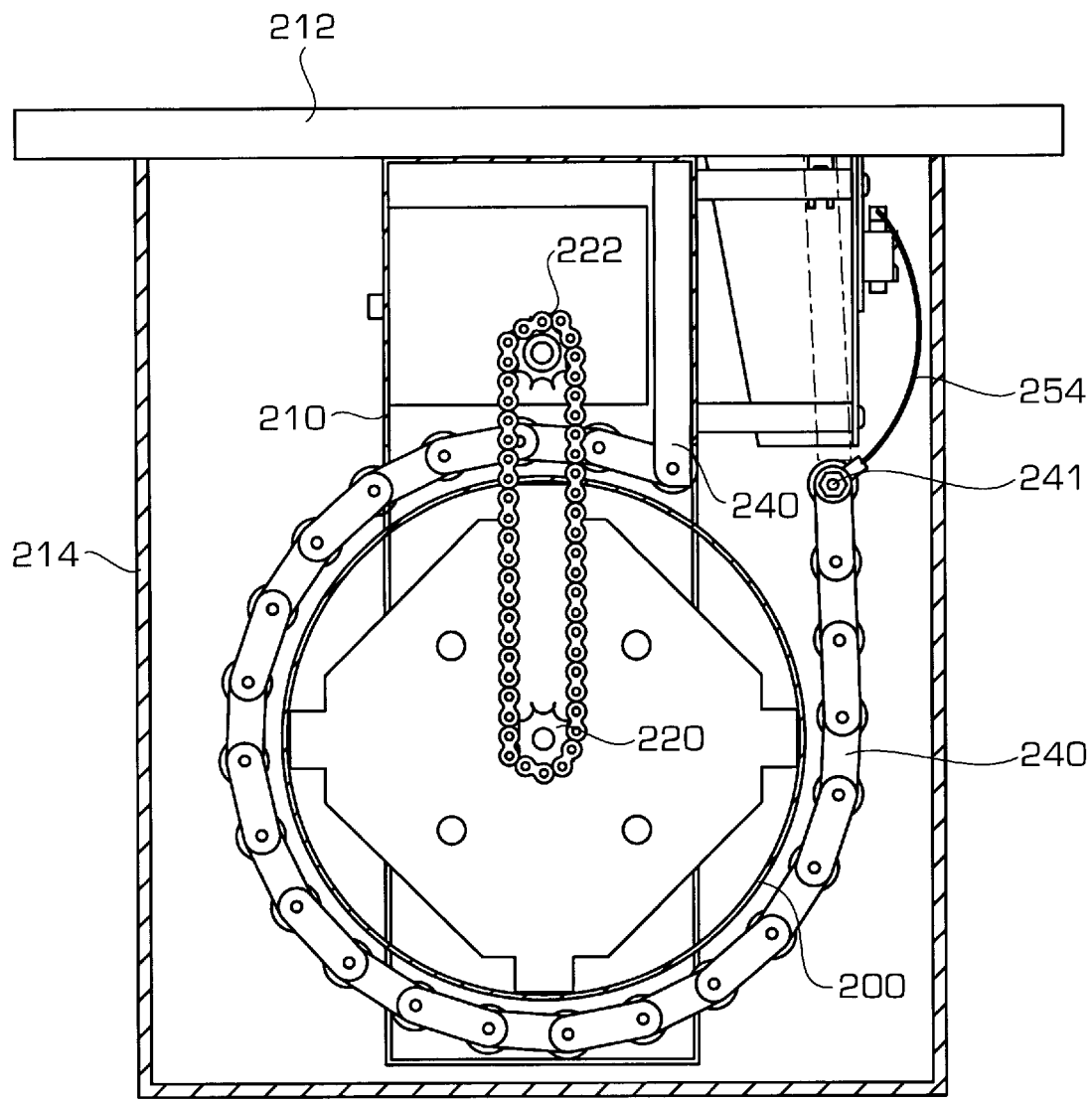
FIG. 19 is a side elevational view of the canister and drum shown in FIG. 17 with the canister being shown in section.
Figure 20:
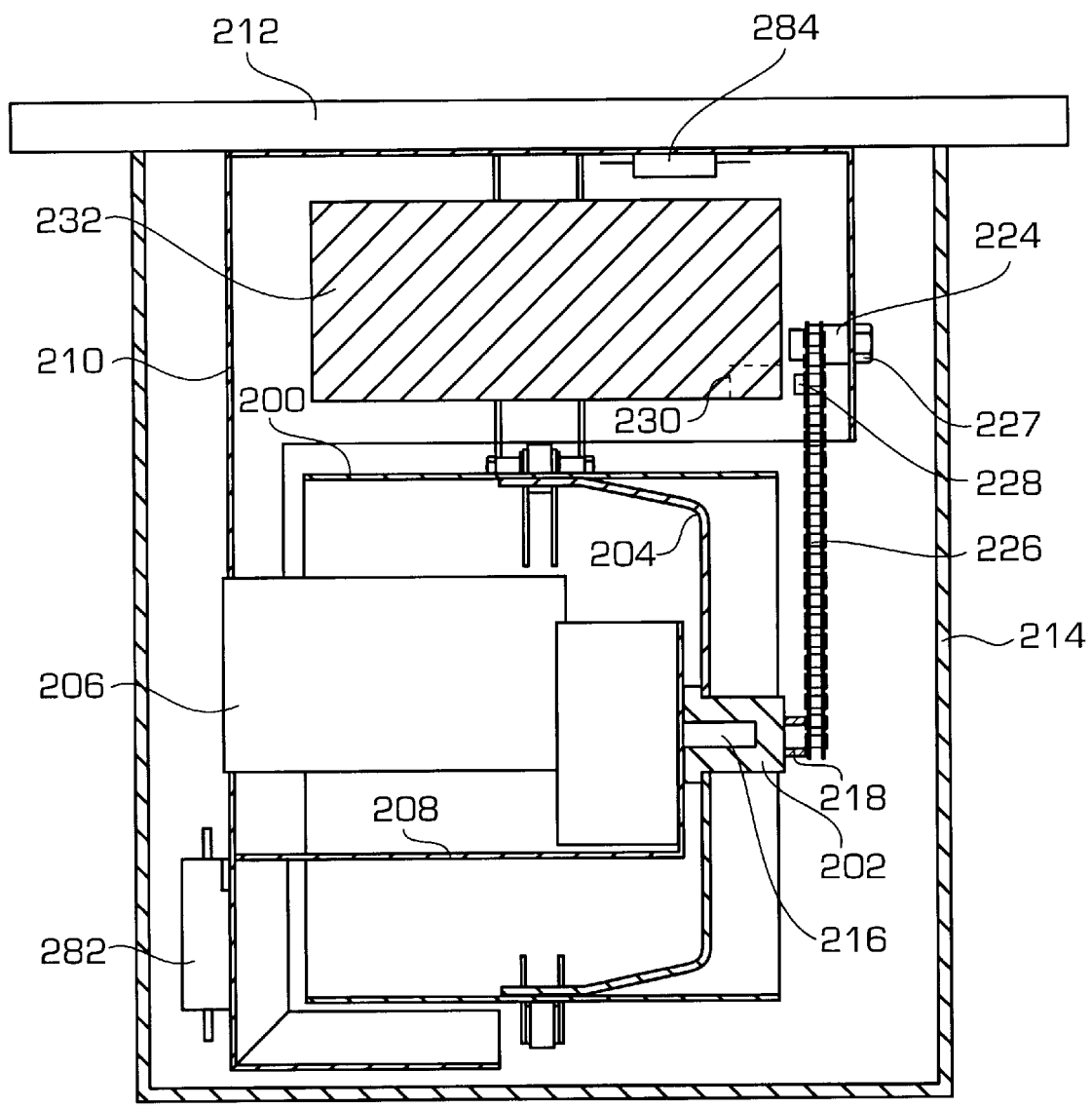
FIG. 20 is a rear elevational view partly in section of the assembly shown in FIG. 17.

A plastic strip 234 is secured to and wound on the drum 200 similar to the arrangement in the first embodiment. However, in lieu of the guide rollers 140 in the first embodiment, a roller chain 240 extends substantially about the entire periphery of the drum in engagement with the plastic strip wound thereon as best seen in FIG. 19. One end of the roller chain 240 is pivotally connected to a downwardly extending projection 241 of the main frame 210 while the other end of the roller chain 240 is connected to a pin 242 which extends outwardly on either side of the chain as best seen in FIG. 18. A pair of coil springs 244 and 246 are connected at their lower end to opposite ends of the pin 242. The upper ends of the springs are connected to opposed projections 248 which are integrally formed with the guide plate 250 which is secured to the main frame by bolts 252. Thus, as the plastic strip 234 is coiled onto the drum 200, the diameter of the drum will increase, thereby exerting pressure on the chain to extend the springs 244 and 246. The end 241 of the roller chain 240 is connected by means of a cord 254 to a pivoted arm 256 of a safety switch 258. Thus, if the plastic strip 234 encounters an obstacle as it is being extended to form a pole, the plastic strip 234 will tend to unravel radially outwardly of the drum 200 causing the roller chain 240 to move downwardly as viewed in FIG. 17 to operate the safety switch 258 to stop the rotation of the drum 200 in the pole extending mode.

The center guide plate 250 is shown in detail in FIGS. 21–23 inclusive and is provided with a substantially V-shaped central portion 260, the sides of which are disposed at an 85° angle relative to each other. The V-shaped portion extends into two parallel walls 262 and 264, which terminate in attachment flanges 266 and 268, which are perpendicular thereto. The projections 248 provide the upper anchor for the coil springs 244 and 246 as shown in FIG. 18. The side view of the guide plate clearly shows the 10° inclination of the V-shaped edge 260 relative to the vertical.

Figure 17:
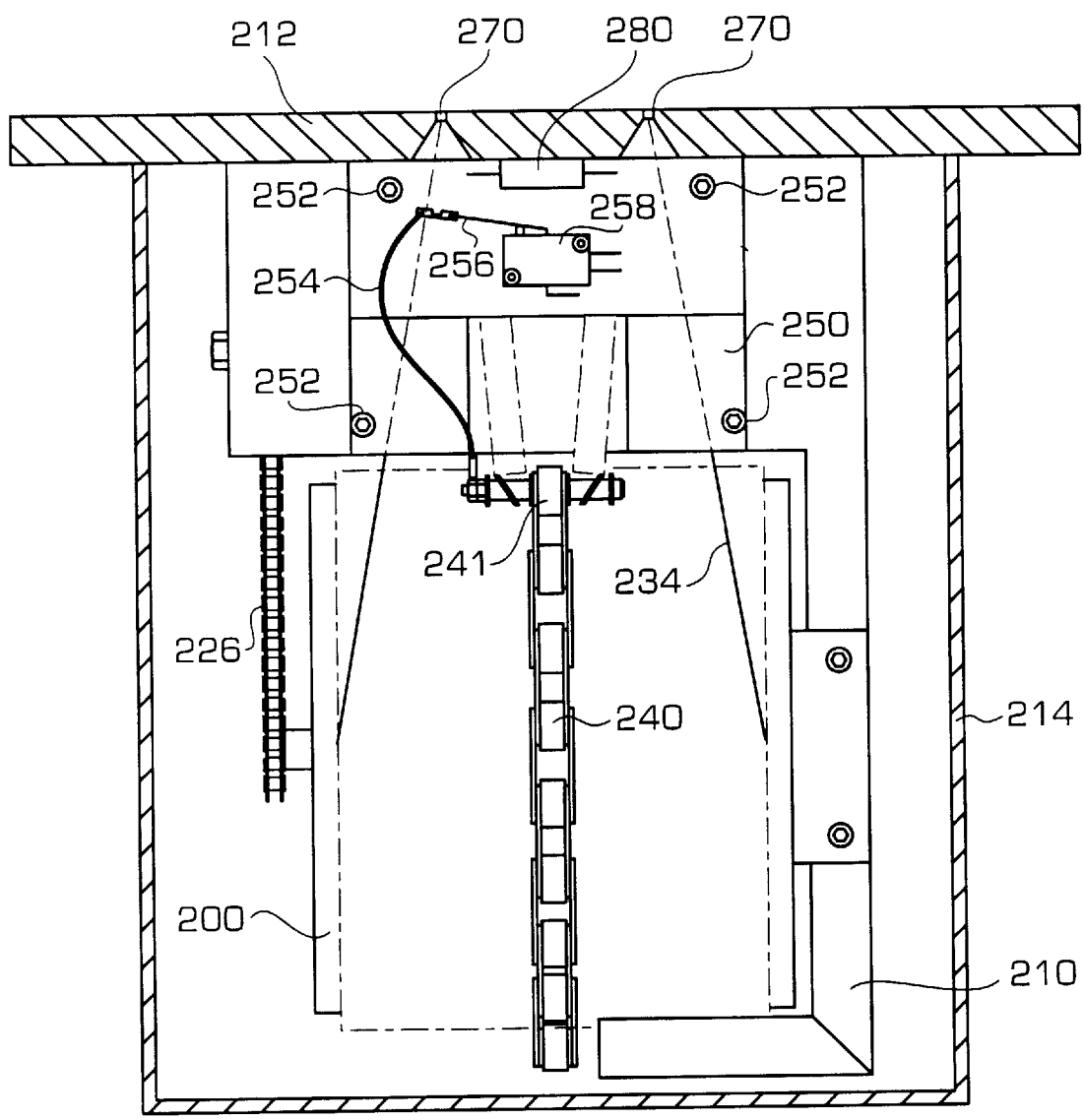
FIG. 17 is a front elevational view of an extendible and retractable pole according to a second embodiment in a retracted position within a canister and wound on a motor driven drum rotatably mounted within the canister, the canister being shown in section.
Figure 24:
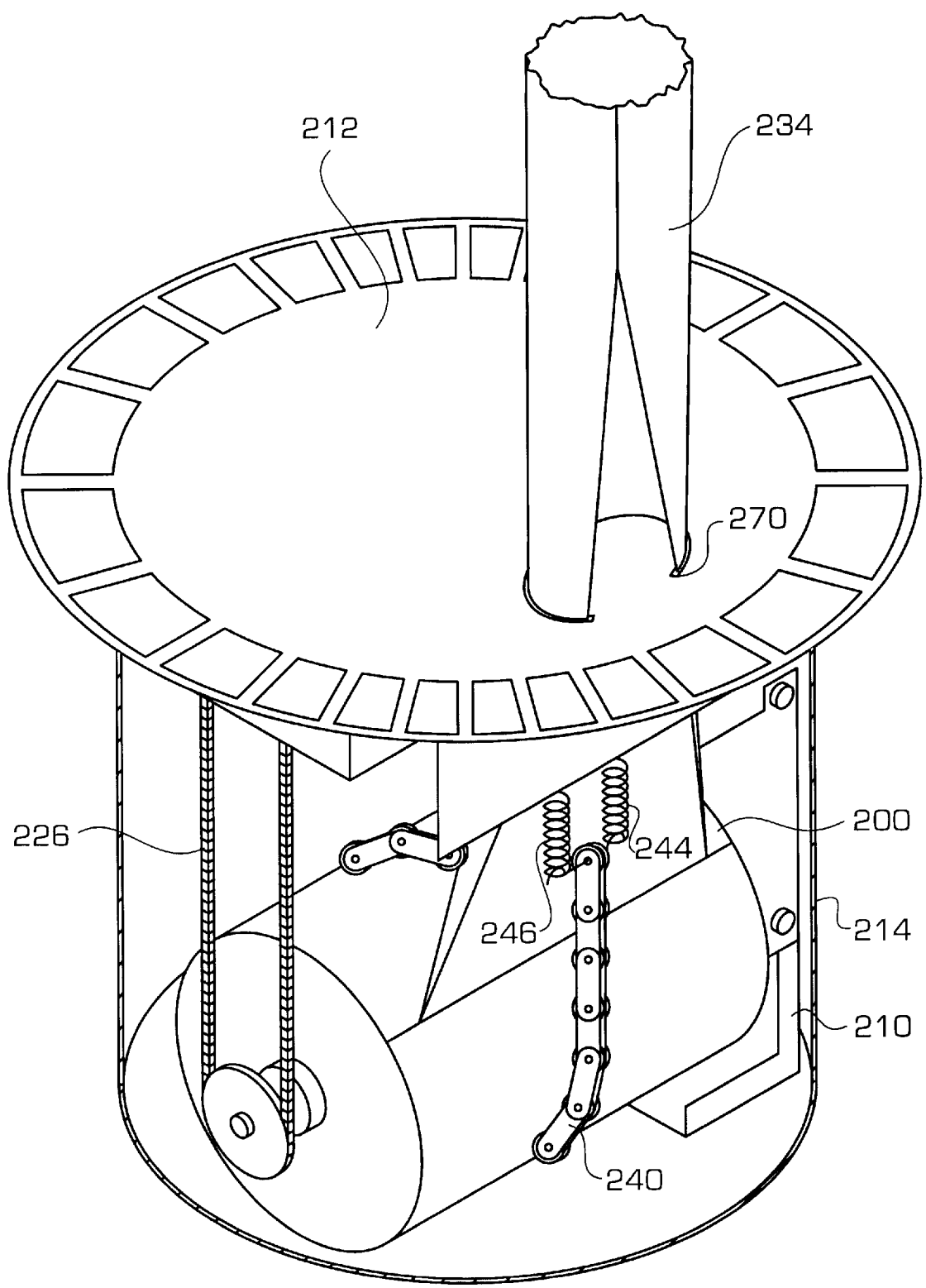
FIG. 24 is a perspective view of the canister, partly in section illustrated in the formation of the pole as the plastic strip unwinds from the drum and passes through a C-shaped slot in the canister cover.

The canister cover 212 is provided with a C-shaped slot 270 as shown in FIGS. 17 and 24. As the plastic strip 234 is unwound from the drum 200, the V-shaped guide plate 260 will engage the strip at the center line thereof to gradually initiate the formation of the strip from a flat strip to a curved strip which passes through the C-shaped slot as shown in FIG. 24. Once the plastic strip exits the C-shaped slot 270, the inherent memory of the plastic strip will form the strip into the safety pole 20. The extension and retraction of the pole are controlled by the magnet 228 on the chain 226 which initiates the starting and stopping of the reversible motor 206 which drives the drum 200. The speed of rotation of the motor 206 is reduced by the gear reduction assembly 207 from which the output shaft 216 extends.

A first heater 280 is mounted on the switch supporting plate 258 which in turn is mounted on the guide plate 250. The electric heater 280 is mounted adjacent the canister cover 212 in the vicinity of the C-shaped opening for keeping the opening free of ice and snow to allow the plastic strip to pass freely through. A second heater 282 is mounted on the main frame 210 adjacent the bottom of the canister 214 to assist in the evaporation of any moisture accumulating in the bottom of the canister. Both of the heaters 280 and 282 are operated under the control of a thermostat 284 which is mounted on the upper end of the main frame 210 adjacent the canister cover 212.

Figure 25:
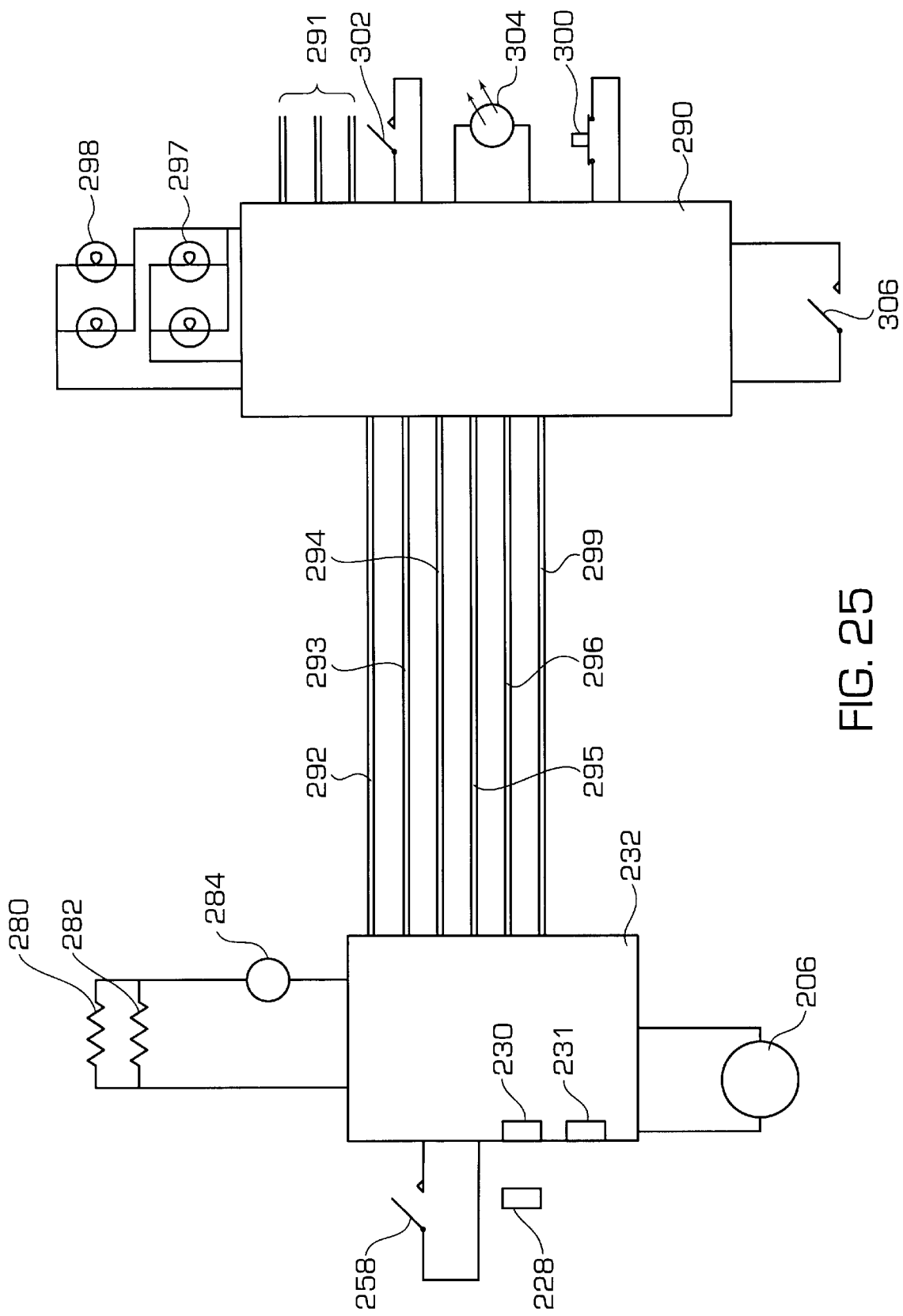
FIG. 25 is a schematic circuit diagram with respect to the second embodiment.

The wiring connections for the two heaters, the thermostat, the safety switch, the electric motor and the control switches are shown schematically in FIG. 25.

While the invention has been disclosed as a safety pole for use with a loading dock with the purpose of warning truck drivers not to back-up to or pull away from a loading dock when the pole is in the extended position the safety pole can obviously be used in a number of other situations. A plurality of safety poles could be provided as lane markers in a roadway or parking lot which may be extended or retracted to vary the configuration of the lanes. Also, the safety pole could be used to prevent the unauthorized use of a parking place in a parking garage or a parking lot, wherein an authorized person for the particular parking space would be provided with a coded control for operating the motor similar to a garage door opener remote control. The pole could also be deployed horizontally to act as a gate at a toll facility.

Figure 26:
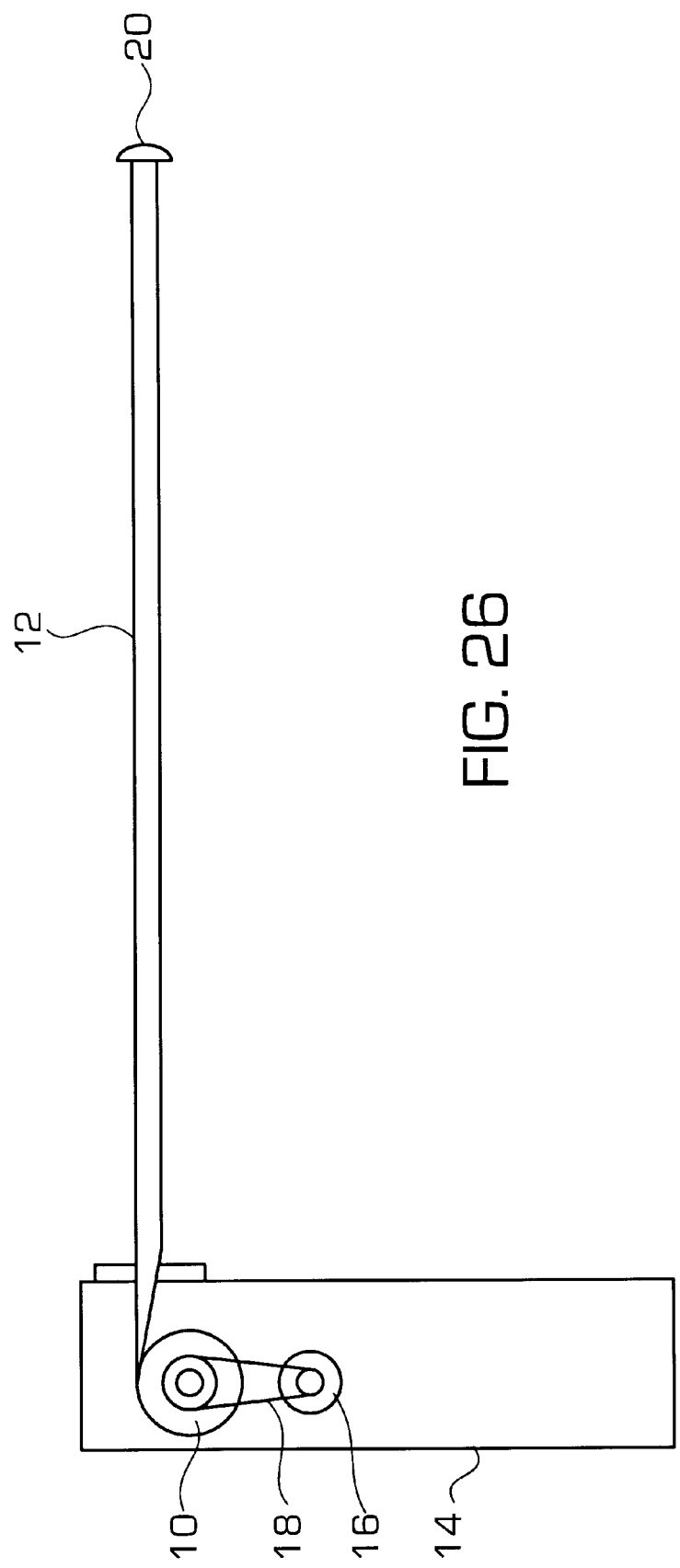
FIG. 26 is a side elevation of a further embodiment according to the present invention showing a horizontally disposed, extendible and retractable pole mounted on a vertically extending post for controlling the flow of traffic.

FIGS. 26–30 inclusive disclose a suitable arrangement for extending and retracting the pole when the pole is deployed horizontally to act as a traffic control barrier at a highway toll facility or a parking facility. As shown in FIG. 26, the plastic strip is unwound from a drum 10 mounted for rotation about a horizontal axis to extend outwardly in the horizontal direction as a safety gate 12. The drum 10 is mounted in a support column 14 and driven by a motor 16 through the belt 18. Since a different type of motor is required for the safety pole as opposed to the safety pole, it became necessary to mount the motor 16 for the safety gate outside of the drum 10.

A cap 20 is provided on the end of the pole or barrier 12 which is made of a soft material such as a sponge-like material to prevent damage to the finish of an automobile or to a passenger in an automobile should the safety gate be extended at the wrong time.

FIG. 27 is a side elevation view of the opposite side of the column 14, as shown in FIG. 26 and shows a timing chain 22 connected between the motor shaft 24 and the shaft 26 of the drum 10. This timing chain is equivalent to and for the same purpose as the timing chain disclosed in the foregoing embodiment directed to a safety pole.

FIG. 28 is a front elevation view of the column 14 and FIG. 29 is a top plan view of the column 14 with the safety gate in a retracted position. A photo sensor 28 is provided in the column 14 for sensing the presence of a vehicle so as to prevent the actuation of the safety gate when a vehicle is passing in front of the column 14.

FIG. 30 is a side elevation view similar to FIG. 26 with the safety gate in the retracted position.

Figure 31:
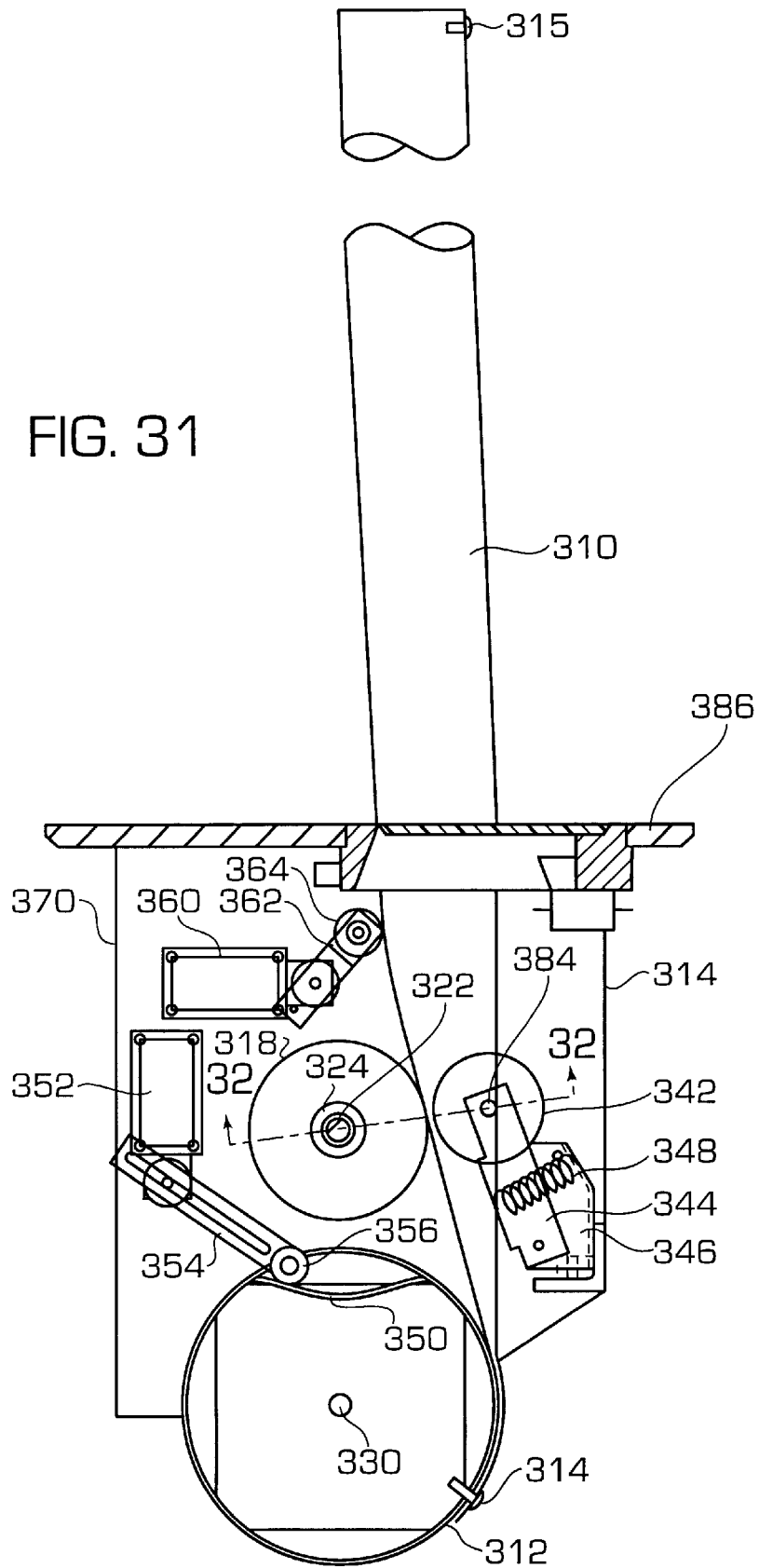
FIG. 31 is a side elevational view partly in section of an alternative drive arrangement for an extendible and retractable plastic pole suitable for use with the vertical safety pole shown in FIGS. 1–3 or the horizontally mounted traffic barrier as shown in FIGS. 26–30.
Figure 32:
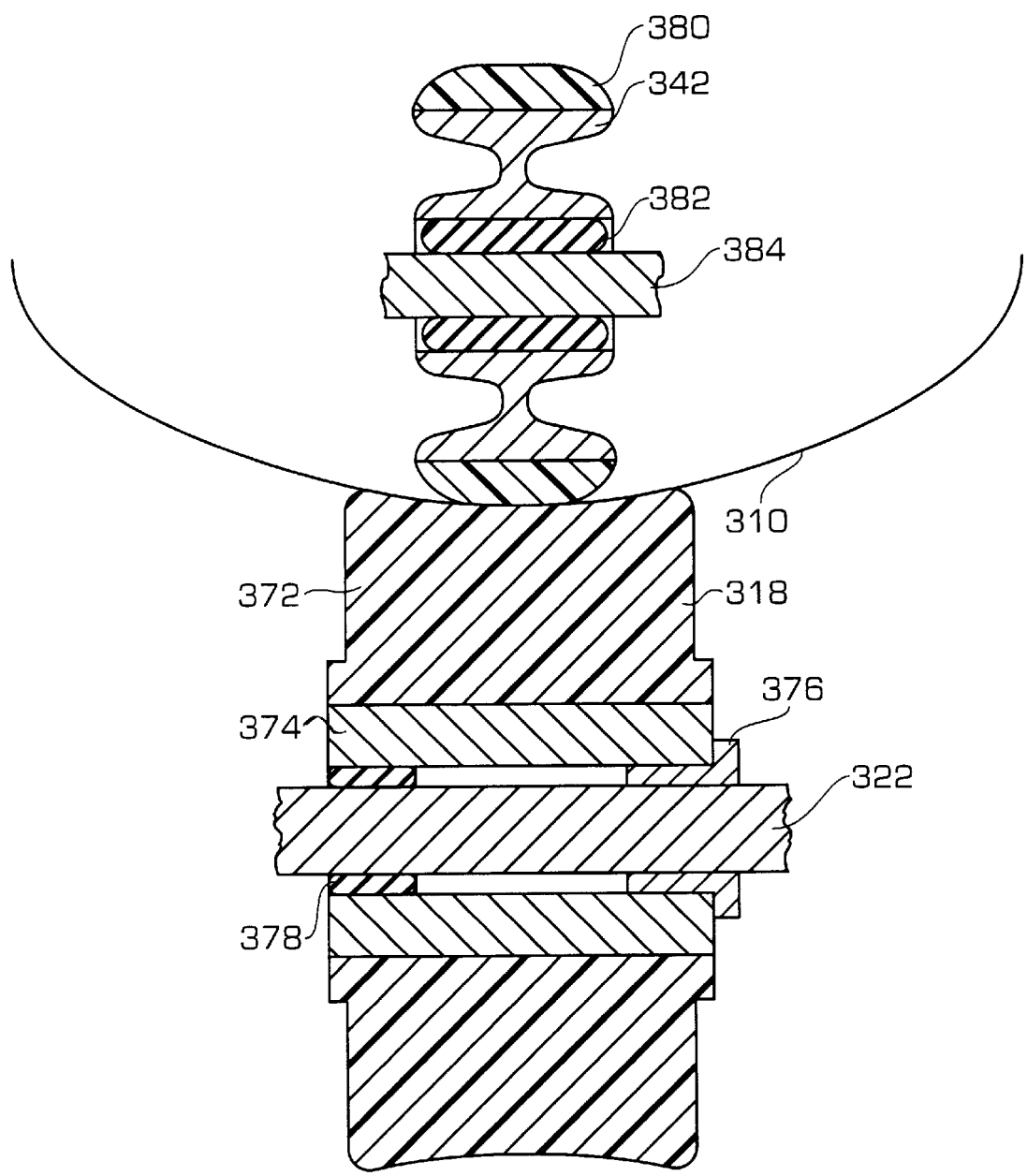
FIG. 32 is a partial sectional view taken along the line A—A in FIG. 31.
Figure 33:
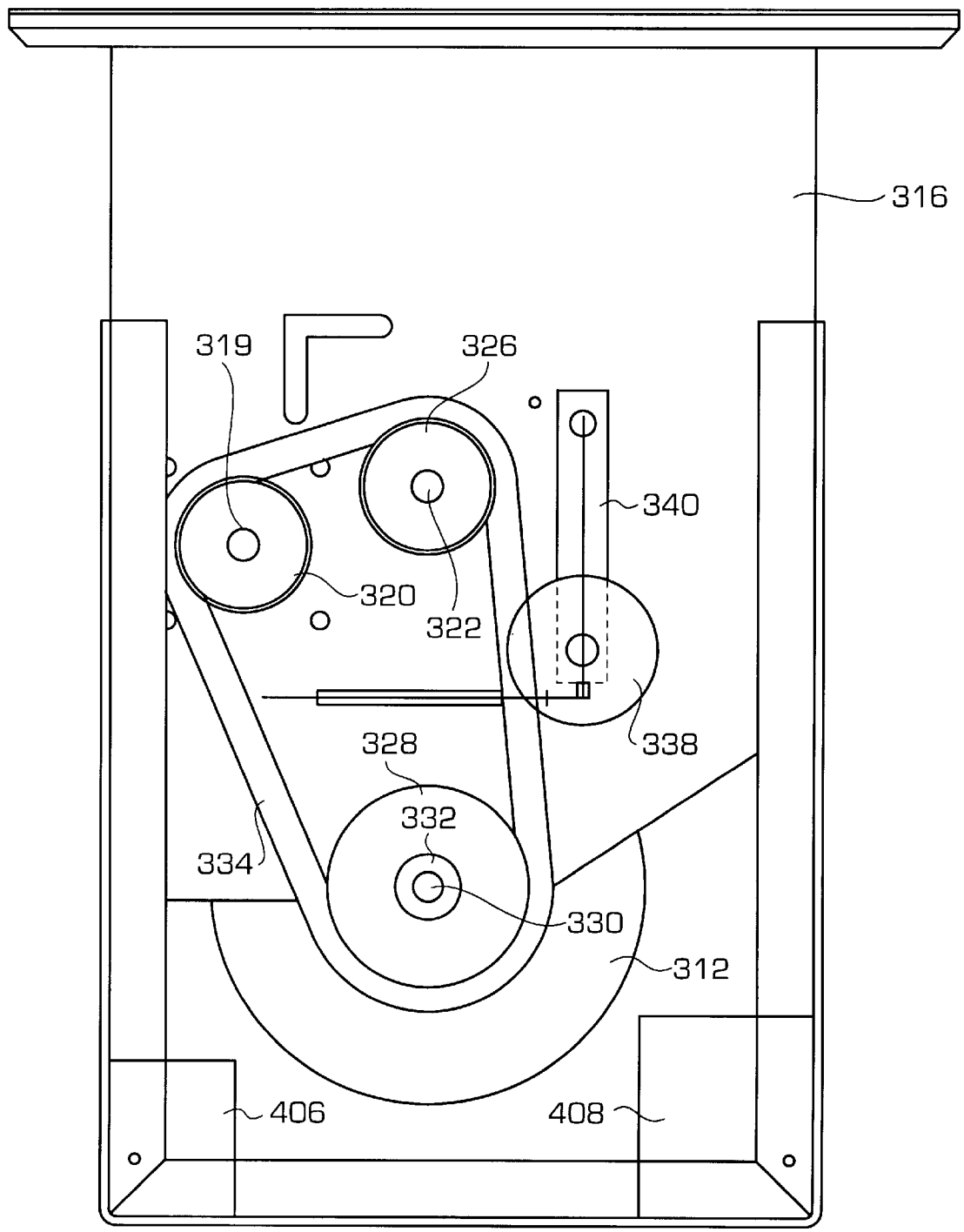
FIG. 33 is an end elevation view of the drive arrangement for the roller and drum shown in FIG. 31.

A further embodiment of an apparatus for extending and retracting the pole according to the present invention is disclosed in FIGS. 31–37 inclusive. The pole 310, as shown in FIG. 31, is in the extended position with one end secured to a wind-up drum 312 by means of rivets 314, one of which is shown in FIG. 31. The drum 312, which is shown in section in FIG. 31, is mounted for rotation between two spaced apart plates 314 as shown in FIG. 31 and 316 as shown in FIG. 33. A reversible electric motor (not shown) having an output shaft 319 has a chain sprocket 320 mounted thereon for rotation in opposite directions. A drive wheel 318 is rotatably mounted on a shaft 322 through a one-way clutch 324. A chain sprocket 326 is also mounted on the shaft 322. A chain sprocket 328 is mounted on the drum shaft 330 through a one-way clutch 332. The details of the one-way clutches are old and well known in the art and accordingly are not shown in detail.

The three chain sprockets 320, 326 and 328 are all mounted in a common plane and a drive chain 334 is disposed in engagement with all three chain sprockets. When the motor 320 is driven in the direction to rotate the drum 312 in the clockwise direction as shown in FIG. 31 to wind up the pole 310 on the drum, the chain sprocket 328 will be coupled to the drum shaft 330 through the one-way clutch. However, the one way clutch 324 will allow the chain sprocket 326 and the shaft 322 to rotate without imparting rotation to the drive wheel 318. When the motor is driven in the opposite direction, the drive will be imparted through the one-way clutch 324 to drive the drive wheel 328 in order to extend the pole outwardly of the casing.

An idler chain sprocket 338 is rotatably mounted on a spring biased lever 340 for engagement with the chain 334. A pressure wheel 342 is rotatably mounted on a lever 344 which is pivotally mounted on a bracket 346. The pressure wheel 342 is normally biased toward the drive wheel 318 by means of the spring 348 for gripping the plastic pole between the drive wheel 318 and the pressure wheel 342.

The outer cylindrical surface of the drum 312 is provided with a groove as best seen in FIGS. 31 and 34. A limit switch 352 is mounted on the support plate 314 and includes a pivoted sensing arm 354 having a roller 356 on one end thereof adapted to be disposed in roller engagement with the pole when it is wound up flat on the surface of the drum. When the pole is completely extended, as shown in FIG. 31, the groove 350 will be uncovered, thereby allowing the roller 356 to enter the groove 350, thereby pivoting the arm 354 to actuate the limit switch 352. This determines the full upward limit for the pole and the motor will be shut off. The lower end of the pole 310 will remain connected to the drum by means of the rivets 314. The overlapping ends of the pole are connected at the outermost end by means of a rivet 315 to help the pole maintain the cylindrical configuration under adverse wind conditions.

A second limit switch 360 is also mounted on the support plate 314 and provided with a pivoted sensing arm 362 having a roller 364 on the outer end thereof adapted to be disposed in rolling engagement with the cylindrically shaped pole 310. When the pole is retracted into the canister 370, the lever 362 will be allowed to rotate further in the clockwise direction to actuate the limit switch 360 to de-activate the drive motor.

The details of the drive roller 318 and the pressure roller 342 are shown in the sectional view of FIG. 32. The outer portion 372 of the drive wheel is comprised of a suitable plastic or rubber material having a circumferential surface with sufficient frictional characteristics to grip the plastic material forming the cylindrical shaped pole. The outer portion 372 is secured to a steel bushing 374 which in turn is supported on the shaft 322 by means of a bronze bushing 376. A one-way cam clutch 378, which is shown schematically in FIG. 32, is also provided between the steel bushing and the shaft 322, whereby the rotation of the shaft 322 will be imparted to the outer portion 372 upon rotation of the shaft in one direction but not the other. The pressure wheel 342 is provided with an outer peripheral portion 380 of the same material as the outer portion 372 of the drive wheel 318. A roller bearing 382, shown schematically in FIG. 32, is provided between the pressure wheel 342 and the shaft 384 supported by the lever 344.

Referring to FIGS. 31, 35 and 36, the cover 386 provided for the canister or housing in which the apparatus is located, is provided with an insert 388 having an opening through which the plastic material will pass as it is extended and retracted from the roller 312. At the time the plastic material passes through the opening 390, the plastic material is not yet formed into a cylindrical pole with overlapping edges. In order to provide a seal to prevent the entry of moisture, a flap 392 of rubber or plastic material is secured to the insert 388 by means of rivets 394. The flap has an enlarged oval portion 396 which corresponds to the opening 390 but which is spaced sufficiently therefrom to allow for the passage of the plastic material. As the plastic material is fed outwardly of the housing, the flap 392 will flex outwardly and upon winding of the plastic material onto the drum, the flap 392 can flex inwardly with respect to the housing.

Figure 37:
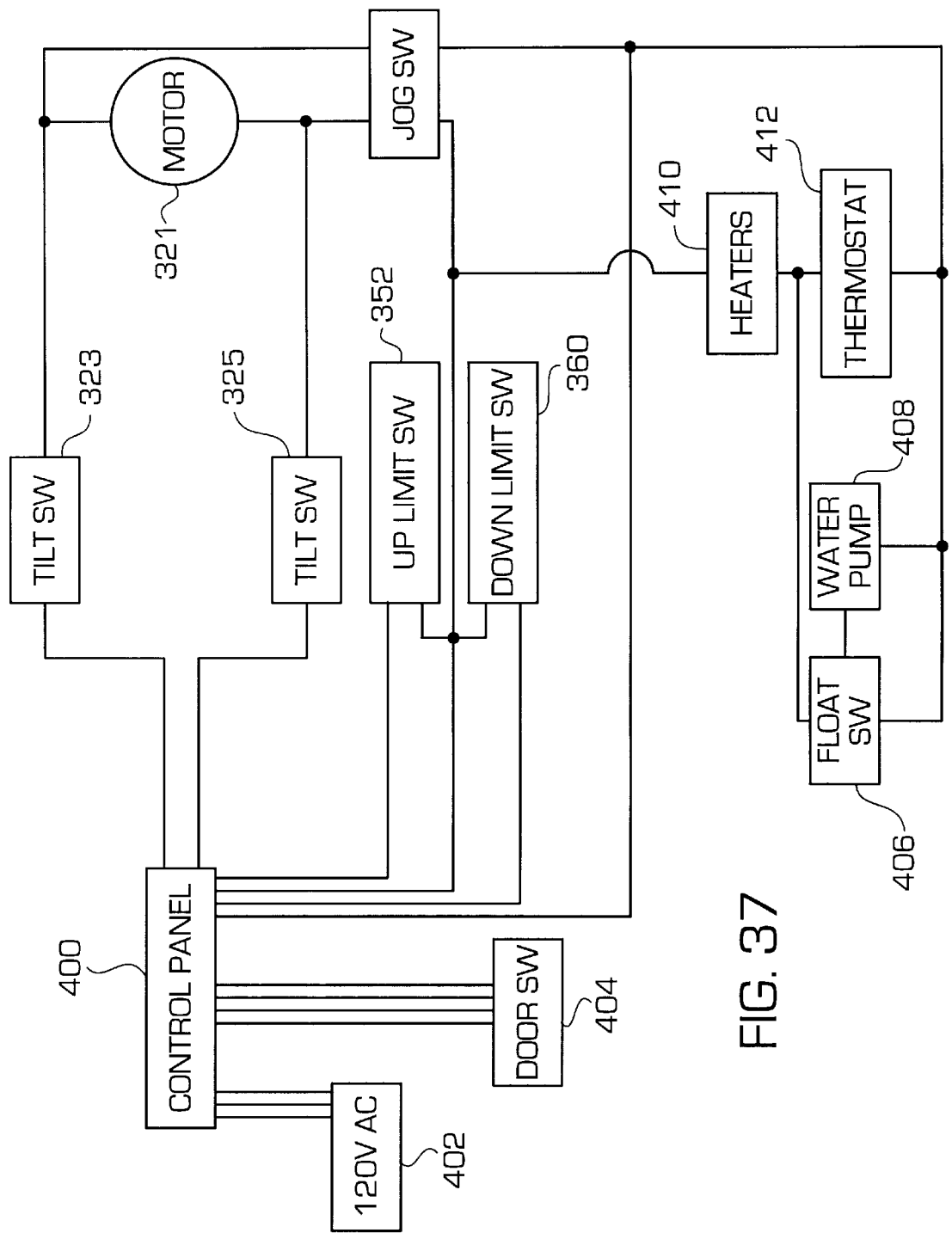
FIG. 37 is a schematic circuit diagram for controlling the arrangement shown in FIG. 31.

The control circuit for the entire assembly is shown in FIG. 37. The control circuit includes a master control panel 400 which is supplied with voltage from a conventional source 402. When the assembly is associated with a loading dock, the loading dock is provided with a door switch 404 as previously described to relate the extension and retraction of the pole to the opening and closing of the warehouse door. The motor 321 for driving the chain sprocket 320 is connected through the control panel and the operation of the motor is under the control of the tilt switches 323 and 325, as well as the up limit switch 352 and the down limit switch 360. The float 406, shown schematically in FIG. 33, and the water pump 408, also shown schematically in FIG. 33, as well as the heaters 410 and thermostats 412, which were previously discussed, are also under the control of the control panel 400.

The drive arrangement for extending and retracting the pole 310 as shown and described with respect to FIGS. 31–37, can be used when the pole is located in an in ground canister for vertical movement as well as when the pole is mounted on a post for horizontal movement. When the drive assembly is mounted on a post for horizontal extension and retraction of the pole, the at and water pump are not necessary and frequently the heaters thermostat can also be eliminated.

While the strip 40 has been referred to as a plastic strip, it is obvious that other type of material having a memory could be used instead of plastic. For example, steel strips can be provided with a curved configuration in the longitudinal direction of the strip in the relaxed condition but which would still enable the strip to rolled up in a flat condition.

While the invention has been particularly shown and described with reference to preferred embodiments thereof, it will be understood by those in the art that the foregoing and other changes in form and details may be made therein without departing from the spirit and scope of the invention.

What is claimed is:

1. An extendible and retractable pole comprised of a housing, a drum rotatably mounted in said housing, motor means for rotating said drum in opposite directions, a flat strip of plastic material secured to and wound on said drum, a cover for said housing having an aperture through which said strip may pass, and guide means mounted in said housing for directing said flat strip of material from said drum outwardly of said housing through said aperture, said strip of material having a shape memory whereby upon extension of said strip outwardly of said housing, said strip will automatically form into a cylindrical shaped pole.

2. An extendible and retractable pole as set forth in claim 1, further comprising pressing means engaging said strip of material on said drum to maintain said strip of material in the flat condition when wound on said drum.

3. An extendible and retractable pole as set forth in claim 2, wherein said pressing means is comprised of a length of roller chain connected at one end to said housing and extending about said drum over a substantial portion of the circumference of the drum, spring means connected between said housing and an opposite end of said chain and safety switch means operatively connected to said opposite end of said chain to stop operation of said motor driven drum upon contact of the strip with an obstacle externally of the housing thereby causing movement of said strip radially outwardly of said drum against said chain.

4. An extendible and retractable pole as set forth in claim 1, wherein said housing is comprised of a canister adapted to be mounted below ground level, a detachable top secured to said housing at ground level having a hole therein through which said strip may extend in a vertical upward manner to provide a safety pole.

5. An extendible and retractable pole as set forth in claim 4, wherein said motor driven drum is mounted on a support frame mounted in a depending manner from said cover to maintain said motor driven drum in vertical spaced relation from a bottom wall of said canister.

6. An extendible and retractable pole as set forth in claim 5, wherein said drum is hollow and rotatably mounted on said frame with said motor being mounted on said frame within said hollow drum.

7. An extendible and retractable pole as set forth in claim 6, further comprising heating means mounted in said housing to prevent build up of snow and ice around said aperture and to evaporate condensation within said housing.

8. An extendible and retractable pole as set forth in claim 1, wherein said housing is mounted on a support and spaced above ground level, said housing having a cover disposed substantially perpendicular to ground level and having a hole therein through which said strip may extend in a horizontal manner to provide a traffic barrier.

9. An extendible and retractable pole as set forth in claim 8, wherein cushion means are secured to a free end of said strip to cushion impact of said strip against an object in the course of being extended.

10. An extendible and retractable pole as set forth in claim 8, further comprising sensor means mounted on said support for detecting a vehicle.

11. An extendible and retractable pole as set forth in claim 1, wherein said motor means is comprised of a reversible motor and drive means disposed between said drum and said aperture for unwinding said strip of material from said drum to extend said strip outwardly of said housing and transmission means for driving said drum in one direction to wind said strip of material on said drum while disconnecting said motor from said rotatable drive means when said motor is rotating in one direction and for transmitting drive from said motor to said rotatable drive means and disconnecting said motor from said drum upon rotation of said motor in an opposite direction.

12. An extendible and retractable pole as set forth in claim 11, wherein said drive means is comprised of a rotatable drive wheel and a spring biased pressure roller for engaging said strip of material therebetween wherein said drive roller and said pressure roller have curved mating peripheral surfaces corresponding to a natural curvature of said strip before leaving said housing through said aperture.

13. An extendible and retractable pole as set forth in claim 1, wherein said pole is defined by edges of said strip overlapping each other and further comprising connecting means for connecting the edges together at an outer end of said pole.

* * * * *